United States Patent
Choe et al.

(10) Patent No.: US 10,642,891 B2
(45) Date of Patent: May 5, 2020

(54) GRAPH MATCHING BY SUB-GRAPH GROUPING AND INDEXING

(71) Applicant: AVIGILON FORTRESS CORPORATION

(72) Inventors: Tae Eun Choe, Reston, VA (US); Hongli Deng, Ashburn, VA (US); Mun Wai Lee, Ashburn, VA (US); Feng Guo, Los Gatos, CA (US)

(73) Assignee: AVIGILON FORTRESS CORPORATION, Vancouver, British Columbia (CA)

( * ) Notice: Subject to any disclaimer, the term of this patent is extended or adjusted under 35 U.S.C. 154(b) by 1392 days.

(21) Appl. No.: 14/252,661

(22) Filed: Apr. 14, 2014

(65) Prior Publication Data

US 2014/0324864 A1 Oct. 30, 2014

Related U.S. Application Data

(60) Provisional application No. 61/811,378, filed on Apr. 12, 2013.

(51) Int. Cl.
*G06F 16/73* (2019.01)
*G06F 16/71* (2019.01)

(52) U.S. Cl.
CPC .............. *G06F 16/73* (2019.01); *G06F 16/71* (2019.01)

(58) Field of Classification Search
CPC ......... G06F 17/30823; G06F 17/30858; G06F 16/73; G06F 16/71
USPC ......................................................... 707/737
See application file for complete search history.

(56) References Cited

U.S. PATENT DOCUMENTS

| | | | | |
|---|---|---|---|---|
| 6,847,980 B1* | 1/2005 | Benitez | ............. | G06F 17/30017 707/739 |
| 7,143,434 B1* | 11/2006 | Paek | ................. | G06F 17/30858 345/619 |
| 8,589,315 B2* | 11/2013 | Medasani | .......... | G06K 9/00369 706/1 |
| 2009/0292685 A1* | 11/2009 | Liu | ................... | G06F 17/30823 |
| 2010/0061624 A1* | 3/2010 | Cobb | .................. | G06K 9/6215 382/157 |

(Continued)

OTHER PUBLICATIONS

Aggarwal, Charu and Haixun Wang. "On Dimensionality Reduction of Massive Graphs for Indexing and Retrieval." IEEE. 2011. pp. 1091-1102.*

(Continued)

*Primary Examiner* — Kimberly L Wilson
(74) *Attorney, Agent, or Firm* — Muir Patent Law, PLLC

(57) ABSTRACT

Relational graphs may be used to extract information. Similarities between the relational graphs and the items they represent may be determined. For example, when applied to video searching, relational graphs may be obtained from searching videos to extract objects, events and/or relations therebetween. Each relational graph may comprise a plurality of nodes and edges, wherein at least some of the detected objects and events are represented by each node, and wherein each edge and represents a relationship between two nodes. Subgraphs may be extracted from each relational graph and dimension reduction may be performed on the subgraphs to obtain a reduced variable set which may then be used to perform searches, such as similarity analyses of videos.

25 Claims, 22 Drawing Sheets

(56) References Cited

U.S. PATENT DOCUMENTS

| | | | | |
|---|---|---|---|---|
| 2011/0078159 | A1* | 3/2011 | Li | G06F 17/30448 707/749 |
| 2011/0289071 | A1* | 11/2011 | Gangadhar | H04L 45/48 707/722 |
| 2011/0317982 | A1* | 12/2011 | Xu | G06F 17/30843 386/241 |
| 2012/0197898 | A1* | 8/2012 | Pandey | H04L 67/12 707/741 |
| 2012/0209853 | A1* | 8/2012 | Desai | G06F 17/30675 707/741 |

OTHER PUBLICATIONS

Salton et al., Introduction to Modern Information Retrieval, McGraw Hill Book Company, 1983.
Barbu et al., "Graph Partition by Swendsen-Wang Cuts." Proceedings of the Ninth IEEE International Conference on Computer Vision, 1:320-327, 2003.
Blei et al., "Latent Dirichlet Allocation." Journal of Machine Learning Research, 3:993-1022, 2003.
Chang et al., "A Fully Automated Content Based Video Search Engine Supporting Spatio-Temporal Queries." IEEE Transactions on Circuits and Systems for Video Technology, 8:5:602-615, 1998.
Conte et al., "Thirty Years of Graph Matching in Pattern Recognition." International Journal of Pattern Recognition and Artificial Intelligence, 18:3:265-298, 2004.
Earley, "An Efficient Context-Free Parsing Algorithm." Communications of the Association for Computing Machinery, 13:2:94-102, 1970.
Fei-Fei et al., "A Bayesian Hierarchical Model for Learning Natural Scene Categories." IEEE Computer Society Conference on Computer Vision and Pattern Recognition, 2:524-531, 2005.
Fergus et al., "Learning Object Categories from Google's Image Search." IEEE International Conference on Computer Vision, 2:1816-1823, 2005.
Hoffmann, "Probabilistic Latent Semantic Indexing." Proceedings of the 22nd Annual International SIGIR Conference on Research and Development in Information Retrieval, 50-57, 1999.
Niebles et al., "Unsupervised Learning of Human Action Categories Using Spatial-Temporal Words" International Journal of Computer Vision, 79:299-318, 2008.
Oh et al., "A Large-scale Benchmark Dataset for Event Recognition in Surveillance Video." Proceedings of the IEEE Conference on Computer Vision and Pattern Recognition, 3153-3160, 2011.
Richardson et al., "Markov Logic Networks" Mach. Learn., 62:107-136, 2006.
Shearer et al., "Video Indexing and Similarity Retrieval by Largest Common Subgraph Detection Using Decision Trees." IDIAP Research Report, 1-25, Apr. 2000.
Fodor, "A Survey of Dimension Reduction Techniques." Lawrence Livermore National Laboratory Technical Report, UCRL-ID-148494, 1-18, 2002.
Snoek et al., "Adding Semantics to Detectors for Video Retrieval." IEEE Transactions on Multimedia, 9:5:975-986, 2007.
Snoek et al., "Multimedia Event based Video Indexing using Time Intervals." IEEE Transactions on Multimedia, 7:4:638-647, 2005.
Wang et al., "Semi-Latent Dirichlet Allocation: A Hierarchical Model for Human Action Recognition." Second Workshop on Human Motion, Lecture Notes in Computer Science, 4814:240-254, 2007.
Wu et al., "A Numerical Study of the Bottom-Up and Top-Down Inference Processes in And-Or Graphs." International Journal of Computer Vision, 93:226-252, 2011.
Yan et al., "Substructure Similarity Search in Graph Databases." SIGMOD, Jun. 2005.
Zhang et al., "Global Data Association for Multi-Object Tracking Using Network Flows." IEEE Conference on Computer Vision and Pattern Recognition, pp. 1-8, 2008.
Zhu et al., "Quest for a Stochastic Grammar of Images." Foundations and Trends of Computer Graphics and Vision, 2:4:259-362, 2006.

* cited by examiner

FIG. 7A

Single node (33)
HUMAN    SEDAN
PICKUP_TRUCK
LAND_VEHICLE
drops_passenger
passes_object
meets       moves
disembark   follows
convoys     unloads
...

Two nodes (1384)
meets+hasPatient+HUMAN
follows+hasPatient+HUMAN
moves+During+meets
turns+Before+meets
follows+During+meets
loads+spatialNear+rides
embarks+hasPatient+LAND_VEHICLE
rides+hasPatient+LAND_VEHICLE
...

Three nodes (37431)
leads+Before+moves:leads+hasPatient+SEDAN
follows+hasPatient+HUMAN:follows+Before+stops
decelerates+hasPatient+HUMAN:decelerates+Starts+follows
leads+Equals+follows:leads+Before+follows
convoys+Starts+leads:convoys+Equals+convoys
...

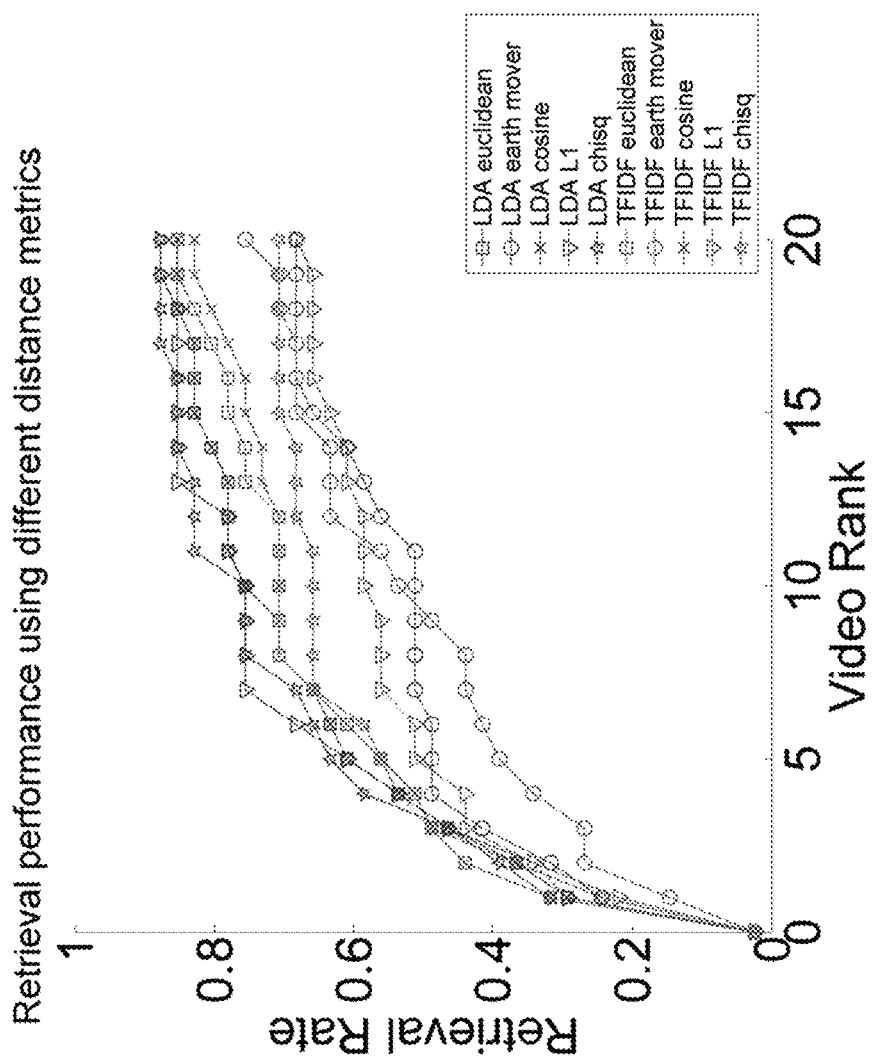

FIG. 9A
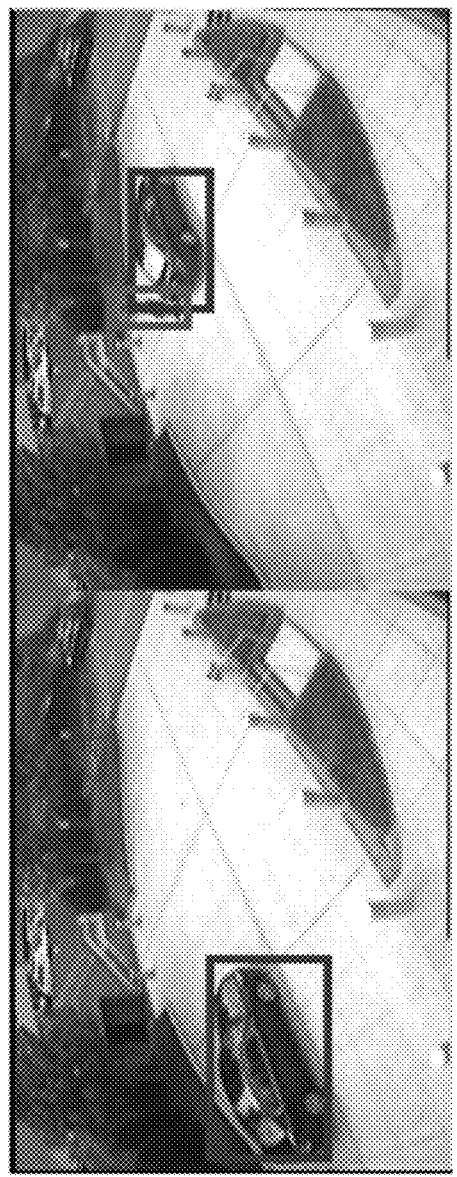
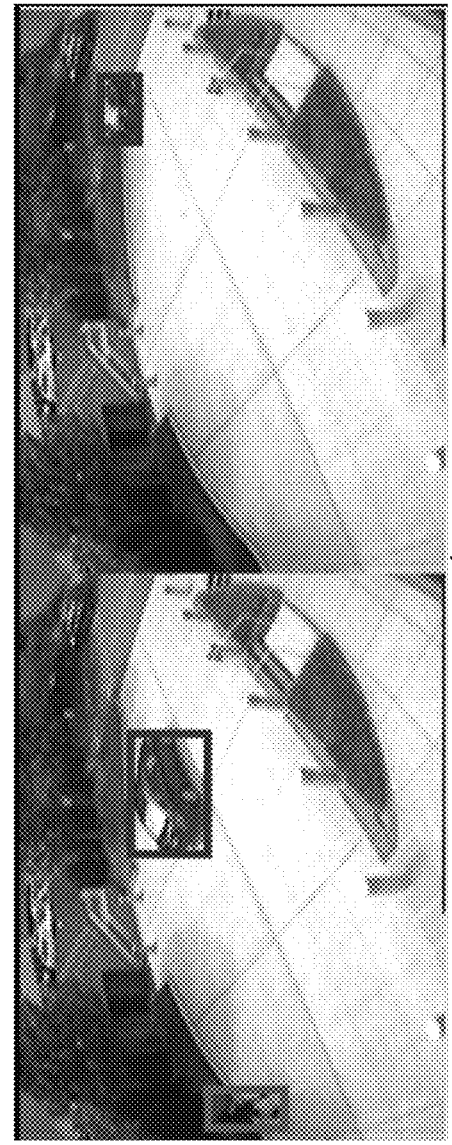
(a) Query Video: Car appears, car stops, human gets out of car, human comes back to car, human gets into car, car goes away

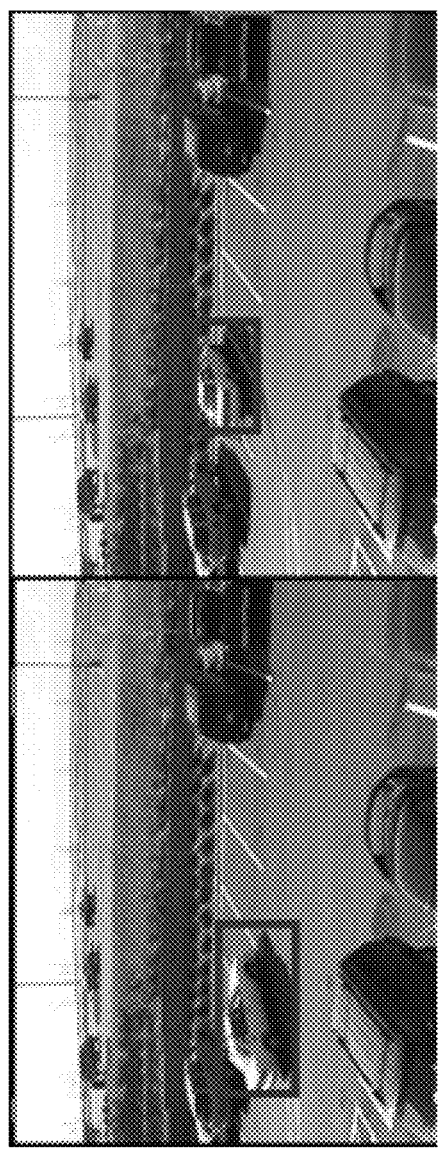
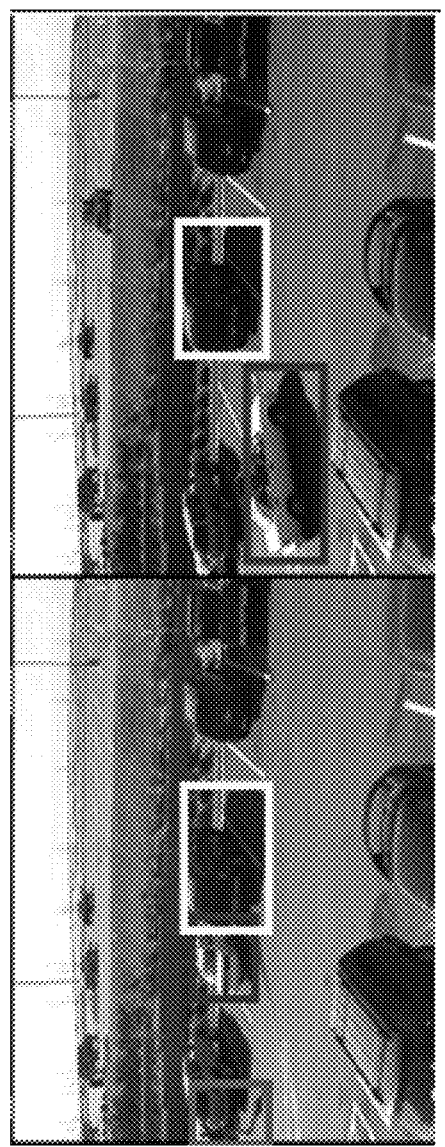
FIG. 9B
(b) First Ranked Video: Contains the same events as Query Video, and other events.

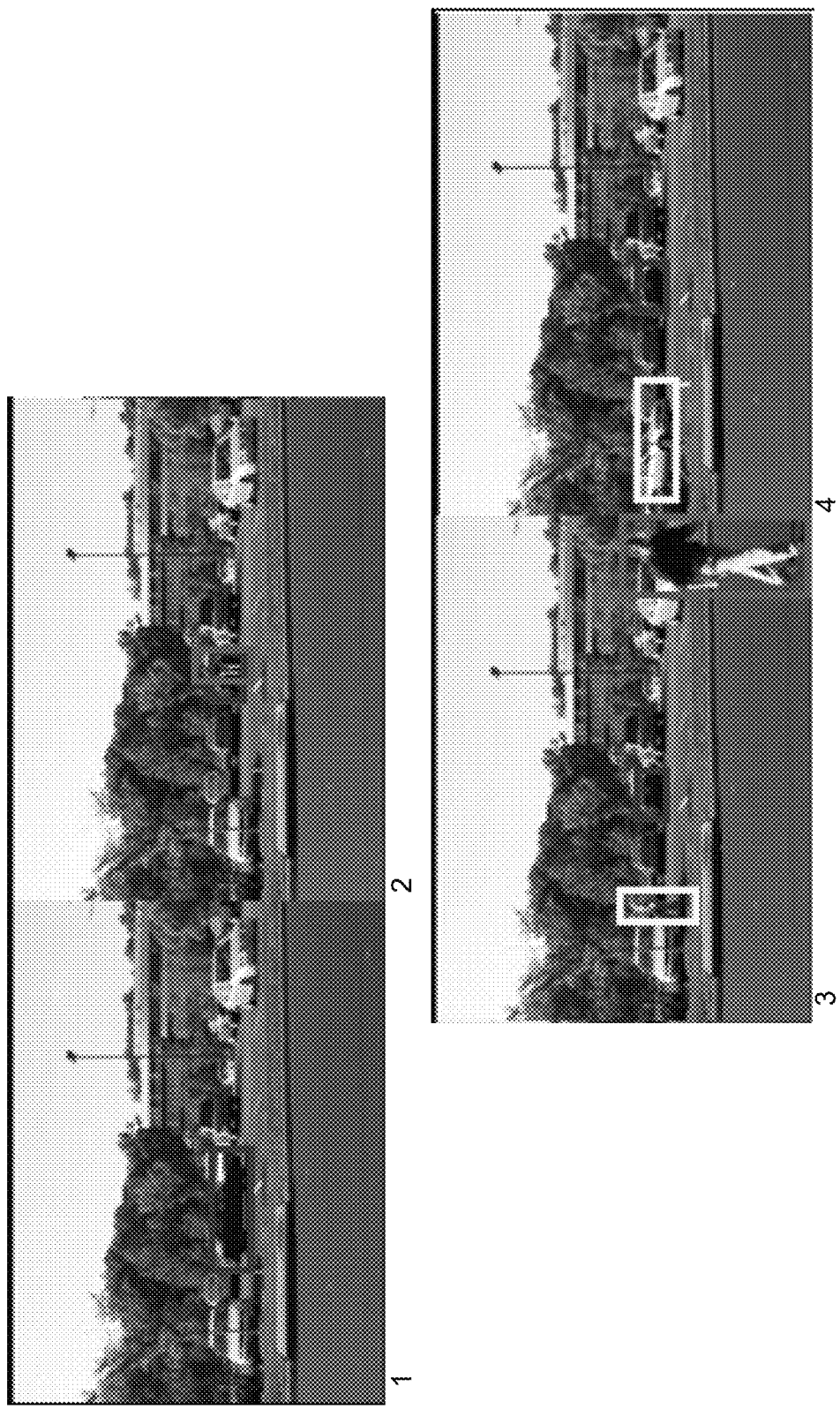

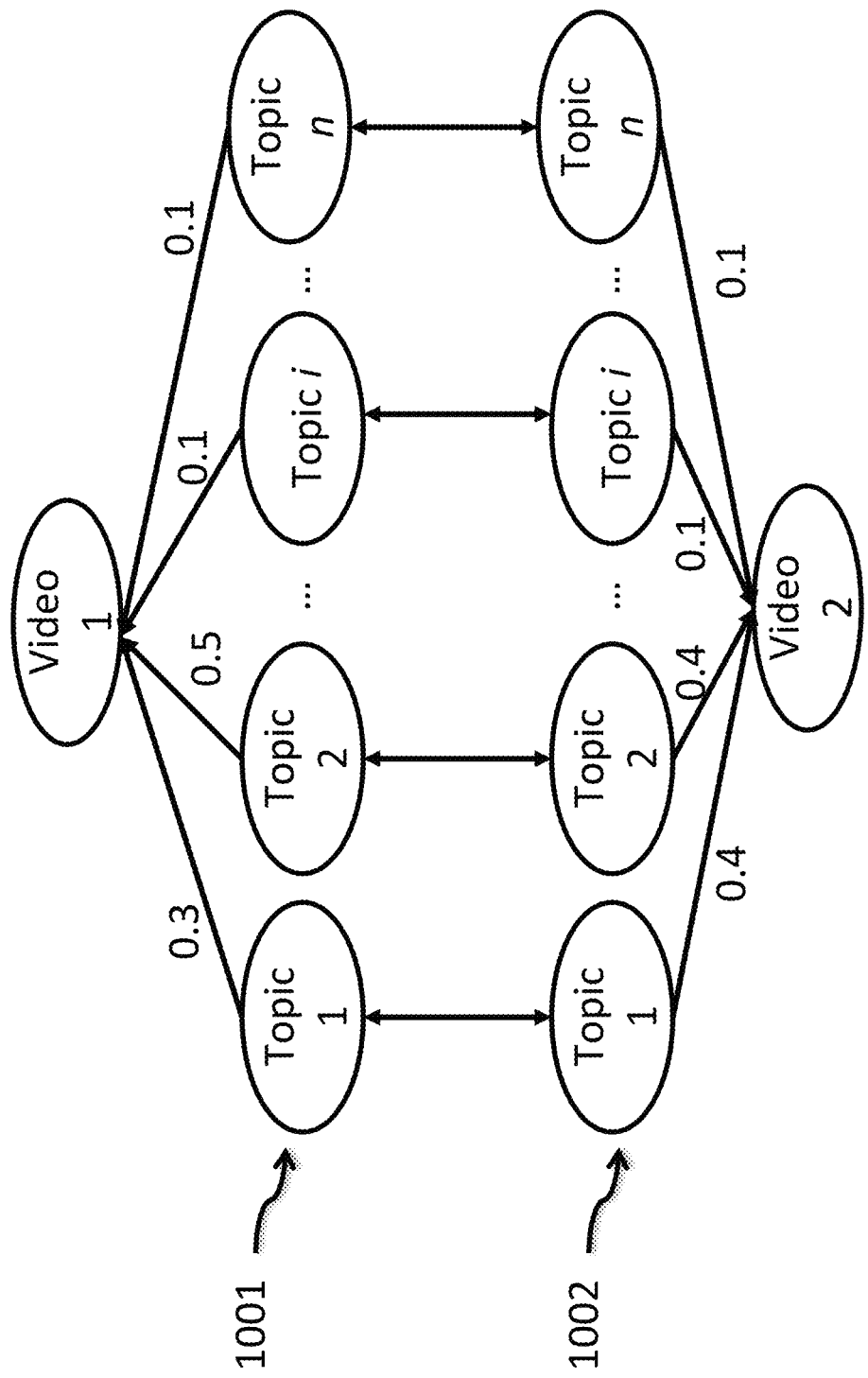

GRAPH MATCHING BY SUB-GRAPH GROUPING AND INDEXING

CROSS-REFERENCE TO RELATED APPLICATIONS

This application claims priority under 35 U.S.C. 119(e) to U.S. Provisional Application No. 61/811,378, filed Apr. 12, 2013, and which is incorporated in its entirety herein by reference.

BACKGROUND

Video surveillance and video in general is becoming more and more prominent in private as well as public spaces, as well as on the Internet and on other remotely-accessible media. As the amount of video stored on various computer systems increases, it becomes more difficult to search for desirable videos. In some instances, a video search may be carried out by selecting a video clip, and then having a computer system automatically retrieve similar videos. Different types of similarities may be compared in order to retrieve relevant videos.

For a conventional video retrieval system, color (histogram or correlogram) and visual features (e.g. HOG, SIFT) are commonly used to find similar scenes, rather than finding similar activities. See, e.g., C. F. Chang, W. Chen, H. J. Meng, H. Sundaram, D. Zhong, "A Fully Automated Content Based Video Search Engine Supporting Spatio-Temporal Queries," PAMI, 1998 (referred to herein as "Chang"); J. C. Niebles, H. Wang, L. Fei-Fei, "Unsupervised Learning of Human Action Categories Using Spatial-Temporal Words," IJCV 2008 (referred to herein as "Niebles"); and Y. Wang, P. Sabzmeydani, G. Mori, "Semi-latent Dirichlet allocation: A hierarchical model for human action recognition", Workshop on Human Motion Understanding, Modeling, Capture and Animation, 2007 (referred to herein as "Wang"), each of which is incorporated by reference herein in its entirety. Especially in surveillance videos, since the activities are often taken at the same sites, conventional retrieval methods cannot typically detect activities of interest. Certain video search schemes are able to retrieve video events using time intervals, and may also include video retrieval concept detectors, which handle multi-modal queries and fuse them to find the best matching videos. See, e.g., C. G. M. Snoek, M. Worring, "Multimedia Event-Based Video Indexing Using Time Intervals," IEEE Trans. on Multimedia, Vol. 7, NO. 4, AUGUST 2005 (hereinafter referred to as "Snoek1"); and C. G. M. Snoek, B Huurnink, L Hollink, M. D. Rijke, G. Schreiber, M. Worring, "Adding semantics to detectors for video retrieval," IEEE Trans. on Multimedia, 2007 (referred to herein as "Snoek2"), each of which is incorporated by reference herein in its entirety. However, these systems may fail to detect semantic events from the videos due to detection error or noise in a video, and those videos will thus not be considered as a search result candidate.

In recent papers, Markov Logic Networks (MLN) and Stochastic Context Sensitive Grammar (SCSG) are described for use with video data representation. SCSGs construct a scene parse graph by parsing stochastic attribute grammars. See, e.g., M. Richardson, P. Domingos "Markov logic networks." Mach. Learn., 62:107-136, 2006 (referred to herein as "Richardson"); and S. C. Zhu, D. Mumford, "Quest for a stochastic grammar of images", Foundations and Trends of Computer Graphics and Vision, vol. 2, no. 4, pp 259-362, 2006 (referred to herein as "Zhu"), each of which is incorporated by reference herein in its entirety. Embodying SCSG, the And-Or graph (AOG) is introduced for scene understanding and can flexibly express more complex and topological structures of the scene, objects, and activities. See, e.g., T. Wu, S. Zhu, "A Numeric Study of the Bottom-up Top-down Inference Processes in And-Or Graphs," ICCV, 2009 (referred to herein as "Wu"), which is incorporated by reference herein in its entirety. In some examples, objects and activities, and their spatial, temporal, and ontological relationships in a scene, are modeled and represented with And-Or Graph (AOG). When the activities are represented as a graph, finding a similar activity may involve matching similar graphs in a video database.

Graph matching may include two categories, exact matching and inexact matching. Exact matching generally requires isomorphism such that vertices and connected edges need to be exactly mapped between two graphs or subgraphs. In addition, exact graph matching is NP-complete. On the other hand, inexact graph matching includes mapping between subsets of vertices with relaxed edge connectivity. It typically finds suboptimal solutions, instead, in polynomial time. See, e.g., D. Conte, P. Foggia, C. Sansone, M. Vento, "Thirty Years Of Graph Matching In Pattern Recognition," Int. Journal of Pat. Rec. and Art. Int., Vol. 18, No. 3, pp. 265-298, 2004 (referred to herein as "Conte"), which is incorporated by reference herein in its entirety. The condition for exact matching may be quite rigid and typically makes it difficult to match graphs.

One type of inexact matching uses subgraph indexing for video retrieval. Graphs may be broken down into subgraphs, and these subgraphs may be used for retrieving videos. See, e.g., K. Shearer, H. Bunke, S. Venkatesh, "Video indexing and similarity retrieval by largest common subgraph detection using decision trees," Pattern Recognition, 2001 (referred to herein as "Shearer"), which is incorporated by reference herein in its entirety. In this system, similar videos are retrieved by simply finding the largest common subgraph. However, the number of subgraphs associated with a graph even of a fairly simple video scene may run in to the thousands, or even millions. Thus, a comparison a for a largest common subgraph may require large processing and storage capabilities.

SUMMARY

Exemplary embodiments include methods of performing video searching, comprising maintaining a storage of a plurality of grouped events in the form of a plurality of corresponding relational graphs, each relational graph having a total possible number of subgraphs; for at least a first grouped event having a corresponding first relational graph, indexing a first set of subgraphs including a plurality of subgraphs, the first set of subgraphs including at least one subgraph having at least 1 nodes; performing dimension reduction for the first grouped event to form a plurality of subgraph groupings, each subgraph grouping including one or more subgraphs of the first set of subgraphs; receiving a search request for a video search, the search request for a portion of a video that includes at least a second grouped event; and based on the plurality of subgraph groupings, determining that the second grouped event matches the first grouped event.

The first set of subgraphs may include all subgraphs of the first relational graph having an order of 1 and all subgraphs of the first relational graph having an order of 2.

Methods may further comprise performing the dimension reduction by selecting a predetermined number of topics, wherein each subgraph grouping is associated with a respective topic.

The predetermined number of topics may be less than the total possible number of subgraphs of the first relational graph.

The predetermined number of topics may be at least two orders of magnitude smaller than the total possible number of subgraphs of the first relational graph.

A particular subgraph may be associated with a plurality of different topics and is weighted differently in at least one of the topics compared to the others.

The second grouped event may have corresponding second relational graph, and the method may further comprise for the second grouped event, indexing a second set of subgraphs including a plurality of subgraphs, the second set of subgraphs including at least one subgraph having an order of 2; and performing dimension reduction for the second grouped event to form a plurality of subgraph groupings, each subgraph grouping including one or more subgraphs of the second set of subgraphs.

Determining that the second grouped event matches the first grouped event may include comparing the plurality of subgraph groupings of the second grouped event to the plurality of subgraph groupings of the first grouped event.

Each subgraph of the first set of indexed subgraphs may be associated with a weighting factor. The weighting factor for a particular subgraph of the first set of indexed subgraphs may be learned based on a frequency of occurrence of the particular subgraph from a large set of training data.

Methods may further comprise, based on the plurality of subgraph groupings, determining that the second grouped event matches a third grouped event different from the first grouped event; and ranking the first grouped event as a search result having a higher rank than the third grouped event.

Methods may further comprise creating the first relational graph by performing semantic video analysis of a video clip.

Methods may comprise receiving a video search query for a portion of video that includes a first grouped event, the first grouped event corresponding to a first relational graph; indexing a first set of subgraphs for the first grouped event based on the first relational graph, the first set of subgraphs including at least one subgraph having an order of 2; performing dimension reduction for the first grouped event to form a plurality of first subgraph groupings, each first subgraph grouping including one or more subgraphs of the first set of subgraphs; comparing the plurality of first subgraph groupings to a plurality of stored subgraph groupings that correspond to stored grouped events; based on the comparison, determining that the first grouped event matches a stored subgraph grouping of the plurality of stored subgraph groupings; and retrieving a video clip corresponding to the stored subgraph grouping in response to the determining.

Each first subgraph grouping may correspond to a topic related to the video and the stored subgraph grouping corresponds to a topic related to the video clip.

The retrieved video clip may be ranked among a plurality of retrieved video clips based on the comparison.

Methods may comprise maintaining a storage of a plurality of relational graphs including at least a first relational graph, the first relational graph corresponding to a first event in a video and having a total possible number of subgraphs of M; for at least a first event having a corresponding first relational graph, indexing a first set of subgraphs including a plurality of subgraphs, the first set of subgraphs including at least one subgraph having an order of 2; forming a plurality of N subgraph groupings, each subgraph grouping including one or more subgraphs of the first set of subgraphs, wherein N is less than M; receiving a search request for a video search, the search request for a portion of a video that includes at least a second event; and based on the plurality of subgraph groupings, determining that the second event matches the first grouped event.

N may be at least two orders of magnitude smaller than M.

Methods may further comprise maintaining a storage of a plurality of relational graphs, each relational graph representing a set of related information and having a total possible number of subgraphs; for at least a first relational graph corresponding to a first set of related information, indexing a first set of subgraphs including a plurality of subgraphs, the first set of subgraphs including p subgraphs and at least one subgraph having an order of 2; performing dimension reduction for the first relational graph to form k variables derived from the p subgraphs, k being an integer less than p; receiving a search request, the search request for a second set of related information; and based on the k variables, determining that the second set of related information matches the first set of related information.

The k variables may comprise k subgraph groupings, each subgraph grouping including a group of subgraphs from the p subgraphs; each set of related information is a grouped event that is part of a video; and receiving the search request includes receiving a video clip search request.

The second grouped event may have a corresponding second relational graph, and the method may further comprise, for the second grouped event, indexing a second set of subgraphs including a plurality of subgraphs, the second set of subgraphs including at least one subgraph having an order of 2; and performing dimension reduction for the second grouped event to form a plurality of subgraph groupings, each subgraph grouping including one or more subgraphs of the second set of subgraphs. Determining that the second grouped event matches the first grouped event may comprise comparing the plurality of subgraph groupings of the second grouped event to the k subgraph groupings of the first grouped event.

Methods of analyzing video images, may comprise analyzing a first video to detect objects and events; in response to the analyzing, creating a first graph, each graph comprising a plurality of nodes and edges, wherein at least some of the detected objects and events are represented by each node, and wherein each edge and represents a relationship between two nodes; obtaining a plurality of p subgraphs, where p is an integer greater than 1, the subgraphs forming portions of the first graph, at least some of the p subgraphs comprising at least two nodes of the first graph and an edge therebetween; performing dimension reduction on the plurality of p subgraphs to obtain k vectors, k being an integer less than p; and searching the first video using vectors.

Methods may comprise analyzing plural videos to detect objects and events in each video; in response to the analyzing, creating a relational graph for each video to obtain a plurality of relational graphs, each relational graph comprising a plurality of nodes and edges, wherein at least some of the detected objects and events are represented by each node, and wherein each edge and represents a relationship between two nodes; obtaining p subgraphs from the plurality of relational graphs, where p is an integer greater than 1, the p subgraphs forming portions of the relational graphs, at least some of the p subgraphs comprising at least two nodes of the relational graphs and an edge therebetween; performing dimension reduction on the plurality of p subgraphs to obtain a vector of k elements for each of the videos, k being an integer less than p; and searching a first video using the vector.

The dimension reduction comprises topic modeling and each of the k elements comprise a topic, each topic being identified using one or more of the p subgraphs.

The vector may comprise k weights each associated with a topic identified by topic modeling. The method may further comprise searching the first video by performing a comparison using the weight values.

The method may further comprise describing each topic with a vector of weights associated with one or more of the p subgraphs.

The topic modeling may comprise determining topics by performing an analysis of subgraphs of all of the plurality of videos.

Devices and systems for performing the methods are also disclosed here.

A non-transitory, tangible, computer readable storage medium may comprise a program that when executed by a computer system performs the methods described herein.

Computer systems may comprise non-transitory, tangible, computer readable storage mediums; and a processor configured to execute the program stored in the non-transitory, tangible, computer readable storage medium.

BRIEF DESCRIPTION OF THE DRAWINGS

These and/or other aspects, features, and advantages will become apparent and more readily appreciated from the following description of exemplary embodiments, taken in conjunction with the accompanying drawings of which:

FIGS. 7A and 7B show an example experiment according to certain embodiments;

FIGS. 8A-8C show results of example experiments according to certain embodiments;

FIG. 9A shows an exemplary video query according to certain embodiments;

FIGS. 9B-9C show exemplary search results according to certain embodiments.

FIG. 10C illustrates a comparison of topic vectors of two videos.

DETAILED DESCRIPTION

Figure 1:
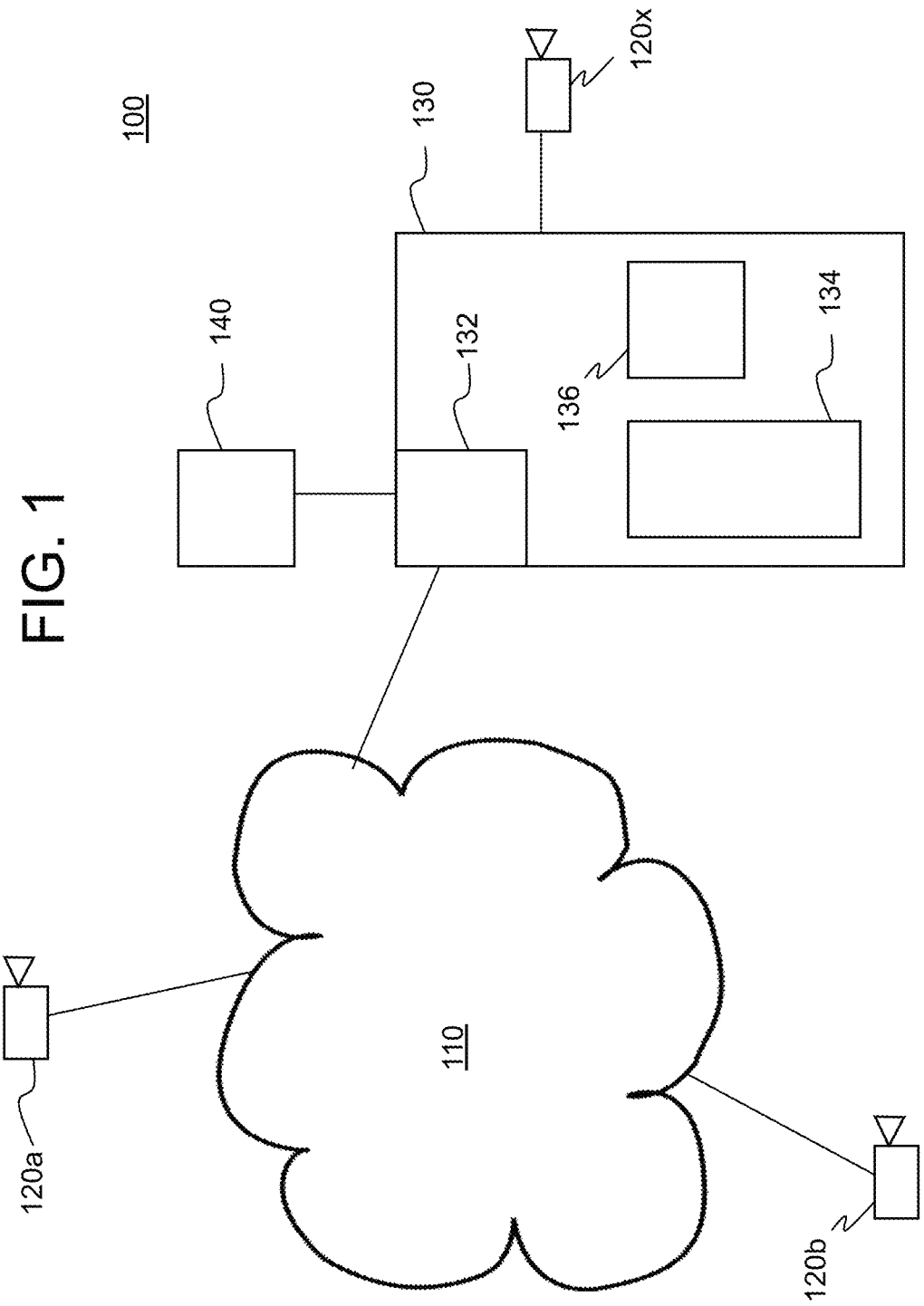
FIG. 1 depicts an exemplary system according to certain embodiments.

The present disclosure now will be described more fully hereinafter with reference to the accompanying drawings, in which various embodiments are shown. The invention may, however, be embodied in many different forms and should not be construed as limited to the embodiments set forth herein. Like numbers refer to like elements throughout.

It will be understood that when an element is referred to as being "connected" or "coupled" to or "in communication with" another element, it can be directly connected or coupled to or in communication with the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another (e.g., as a naming convention). For example, a first event could be termed a second event, and, similarly, a second event could be termed a first event without departing from the teachings of the disclosure.

The terminology used herein is for the purpose of describing particular embodiments only and is not intended to be limiting of the invention. As such, the examples described here are just that—examples. Not all examples within the scope of the general concepts of the invention are discussed herein, and the omission of particular examples does not mean that such examples are excluded from being within the scope of the invention.

As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

A "computer" refers to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" refers to prescribed rules to operate a computer. Examples of software may include: software; code segments; instructions; applets; pre-compiled code; compiled code; interpreted code; computer programs; and programmed logic.

A "computer-readable medium" refers to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

A "computer system" refers to a system having one or more computers. Each computer may include and/or access a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" refers to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

Method steps described herein, although shown in a particular sequence, do not necessarily follow that order. As such, method steps described in this disclosure before or after other method steps, may be in that order, or may occur in other orders if the specification and its context do not indicate otherwise.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 depicts an exemplary system on and for which the various described video analysis and search methods may be implemented. FIG. 1 illustrates a general example of such a system, and the invention should not be limited to this example. Additional elements or fewer elements may be included in the system.

As shown in FIG. 1, an exemplary system 100 may include network 110, one or more video cameras 120a-120x, one or more computer devices 130, and one or more I/O devices 140. For example, one embodiment may simply include a computer connected to a camera and an I/O device. Other embodiments, may include one or more computers connected to a network to which a plurality of cameras are connected.

Network 110 may be, for example, a computer network such as a wide area network (WAN), local area network (LAN), or other network. For example, in one embodiment, network 110 may be implemented on the Internet or a private, secure WAN. Network 110 may include any combination of known wireless, wired, optical, or other communication media and devices.

The video cameras 120a-120x can be, for example, digital or analog cameras including image capturing hardware, such as lenses, image sensors such as CMOS sensors, microprocessors, memory chips, other circuitry, and image processing software. The video cameras may include other known components as well. In one embodiment, the video cameras include hardware and software for performing analysis on collected data, such as video content analysis (VCA). As one example, a video camera may include a video sensor, which may be optionally connected to a video recorder, such as a digital video recorder (DVR) or a network video recorder (NVR). The video recorder may be programmed to perform certain analysis. As such, the video cameras and/or video recorder may serve as a video source for providing video images and video image descriptive data to one or more computing devices 130.

Computing devices 130 may include one or more computers, such as servers, desktop computers, laptop computers, tablets, smart phones, or other such devices. In certain embodiments, for example, a computer device such as 130 may be a server computer that is part of a server system. The server system may include one or more server computers that may singly or collectively perform one of more of the methods disclosed herein. In other embodiments, computer device 130 may correspond, for example, to a desktop computer, or a laptop computer or tablet, which may be portable and wirelessly enabled. Computer devices 130 may include hardware and software that enable such devices to communicate over network 110 using known communication technologies, and that enable the computer devices to perform the methods disclosed herein. For example, computer devices 130 may include an interface 132 using known technologies for communicating with I/O devices and with a network such as the Internet. Computer devices 130 may also include storage 134 and one or more processors 136, and may be connected to one or more I/O devices 140 (e.g., keyboard, display, etc.). The various methods described herein may be implemented using these various elements. For example, computer devices 130 may include stored programs that implement the algorithms described herein in combination with the one or more processors 136 and information stored in storage 134, and may include one or more applications that allow users to interact with, view, and search video. For example, computer devices 130 may include one or more browser applications (e.g., Google Chrome, GoogleEarth, Microsoft Internet Explorer, Safari, or similar browser systems) and an operating system that can display the various pages, images, text, and videos discussed herein.

Additional examples of systems which may be used to implement the various embodiments described herein are described in U.S. Pat. No. 8,564,661 (the '661 patent), issued Oct. 22, 2013; U.S. Patent Application Publication No.: 2013/0266181, published on Oct. 10, 2013; and U.S. Patent Application Publication No.: 2013/0129307, published on May 23, 2013, each of which is incorporated herein in its entirety by reference.

As described further below, the various embodiments described herein provide for novel graph indexing and matching techniques that use graphs and subgraphs, and dimension reduction to better analyze and compare, and in some cases search for, different sets of information. Exemplary embodiments are described primarily in the context of video analysis and searching. However, the concepts described herein are applicable to other fields as well, such as general information retrieval, cheminformatics, bioinformatics, object detection, target tracking, modeling social networks, and protein structure comparison, to give a few examples.

In the context of video, in one exemplary embodiment, a video scene captured by a camera or other recording device may be analyzed semantically to detect objects, actions, events, and groups of events. Particular analysis schemes can be seen, for example, in the '661 patent mentioned previously, as well as in other literature.

As an example, activities in a video scene may be classified (e.g., based on complexity) into four categories, (1) basic action, (2) action, (3) event, and (4) grouped event. A basic action may involve a single agent performing simple activities or gestures (e.g. walk, run, stop, turn, sit, bend, lift hands, etc.). The action may be a single agent interacting with a single subject (e.g., carry a box, open door, disembark from a car, etc.). Both the agent and the subject may be described herein generally as "objects." An event may be described as a single or multiple agents interacting with a single or multiple subjects (e.g. Person_1 passes a ball to Person_2). A grouped event may include a plurality of events occurring concurrently or sequentially (e.g. Human_1 disembarks from a Vehicle_2, meets Human_3, takes a bag_4 from Human_3, and then Human_3 walks away and Human_1 rides Vehicle_2 and leaves the scene).

The term "event" as used herein may specifically refer to a simple event, for example including only one or two objects and a single action, or may refer to a complex event, such as a grouped event including a plurality of simple events occurring, for example, simultaneously and/or sequentially.

Videos may be analyzed to determine scene elements, to recognize actions, and to extract contextual information, such as time and location, in order to detect events. The various elements, actions, and events can be modeled using a relational graph.

Figure 2:
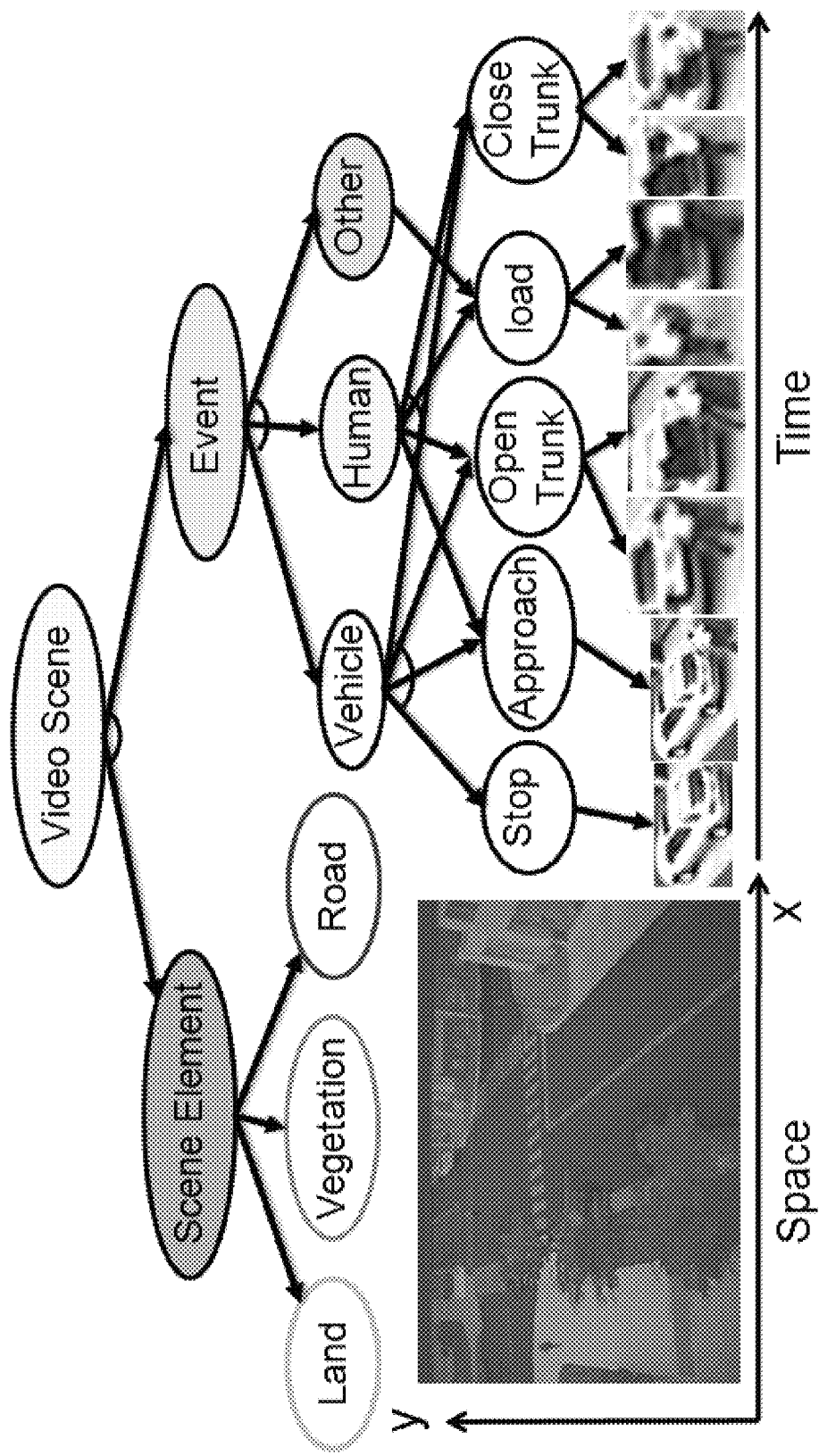
FIG. 2 illustrates an exemplary graphical representation of a scene.

FIG. 2 shows an exemplary graphical representation of a scene (e.g., including a loading event). The graphical representation of the scene serves as a framework for analysis, extraction, and representation of the visual elements and structure of the scene, such as the ground plane, sky, buildings, moving vehicles, humans, and interactions between those entities. Image content extraction may be formulated as a graph parsing process to find a specific configuration produced by the grammar that best describes the image. The inference algorithm may find the best configuration by integrating bottom-up detection and top-down hypotheses. As illustrated in FIG. 2, using a traffic scene as an example, bottom-up detection includes classification of image patches (such as road, land, and vegetation), detection of moving objects, and representation of events, which generate data-driven candidates for scene content. Top-down hypotheses, on the other hand, are driven by scene models and contextual relations represented by the attribute grammar, such as the traffic scene model and human-vehicle interaction model. The fusion of both the bottom-up and top-down approaches results in a more robust video content extraction.

An example of scene element extraction is now described. In particular, analysis of urban scenes benefits greatly from knowledge of the locations of buildings, roads, sidewalks, vegetation, and land areas. Maritime scenes similarly benefit from knowledge of the locations of water regions, berthing areas, and sky/cloud regions. From video feeds, a background image is periodically learned and it is processed to extract scene elements. In one embodiment, over-segmentation is performed to divide an image into super-pixels using the mean-shift color segmentation method. Since adjacent pixels are highly correlated, analyzing scene elements at the super-pixel level reduces the computational complexity. In certain embodiments, for each super-pixel, a set of local features is extracted and super-pixels are grouped by Markov Random Field and Swanson Cut. See, e.g., A. Barbu, S. C. Zhu, "Graph partition by Swendsen-Wang cut," ICCV, 2003 (referred to herein as "Barbu"), which is incorporated by reference herein in its entirety. An example image of extracted scene elements is shown in the bottom left of FIG. 2. The extracted background scene element helps classification and tracking of a target in the scene after transferring to an action recognition routine.

For action recognition, to describe one example, video from a calibrated sensor may be processed and metadata of target information may be generated by detection, tracking, and classification of targets. See, e.g., L. Zhang, Y. Li and R. Nevatia, "Global Data Association for Multi-Object Tracking Using Network Flows", *CVPR*, 2008, hereby incorporated by reference. The metadata may include of a set of primitives, each representing target ID, target's classification type, timestamp, bounding box and/or other associated data for a single detection in a video frame. From metadata, basic actions such as appear, move, or stop actions are further recognized by analyzing the spatio-temporal trajectory of a target. This may be a time consuming process in the system. To process vast amount of video data, a process such as a MapReduce framework (e.g., hadoop.apache.org) may be applied to detect basic actions in video data in a distributed system.

For event recognition, after recognizing basic actions, event related context is extracted, including, for example: (i) agent (e.g., human, vehicle, or general agent), (ii) basic actions of agent (e.g., appear, disappear, move, stationary, stop, start-to-move, turn, accelerate, decelerate, etc.), (iii) properties of events such as time (e.g., in universal time "UTC") and location (e.g., in latitude/longitude), and/or (iv) subjects (e.g., human, vehicle, bag, box, door, etc).

Objects, activities, and spatial (e.g., far, near, beside) and temporal (e.g., before, after, during, etc.) relationships are represented by a parsed graph after parsing grammar of complex events. From training data, parameters are learned (for example, threshold values of location and time are learned to determine spatial and temporal relationships), and the structures of graphs of activities from basic actions to events are built. Particular activities that may be graphed, for example for video surveillance applications, may include:

Basic action: stop/start-to-move, turn, accelerate/decelerate, hold-bag, carry-box, etc.
  Action: approach/move-away, lead/follow, catch-up, over-take, meet, etc.
  Event
    human-object interaction:
      load/unload,
      hand-over
      open/close door/trunk human-vehicle interaction:
  embark/disembark,
  park (a person disembarks a vehicle and the vehicle remains stationary)/ride (a vehicle was stationary, a person embarks the vehicle, and the vehicle drives away),
  drop-passenger (a person disembarks a vehicle and the vehicle drives away)/pickup-passenger (a vehicle arrives, a person embarks, and the vehicle drives away),
  loiter-around,
multi-human-vehicle interaction: switch-driver, convoy, queuing.
Grouped Events: combination of multiple events.

The graph grammar of listed activities may be parsed to infer the events of each video data. The simplified Earley-Stolcke parsing algorithm may be used to infer an event based on a particular event grammar iteratively. See, e.g., J. Earley, "An efficient context-free parsing algorithm", Communications of the Association for Computing Machinery, 13:2:94-102, 1970 (referred to herein as "Earley"), which is incorporated herein by reference in its entirety.

Figure 3:
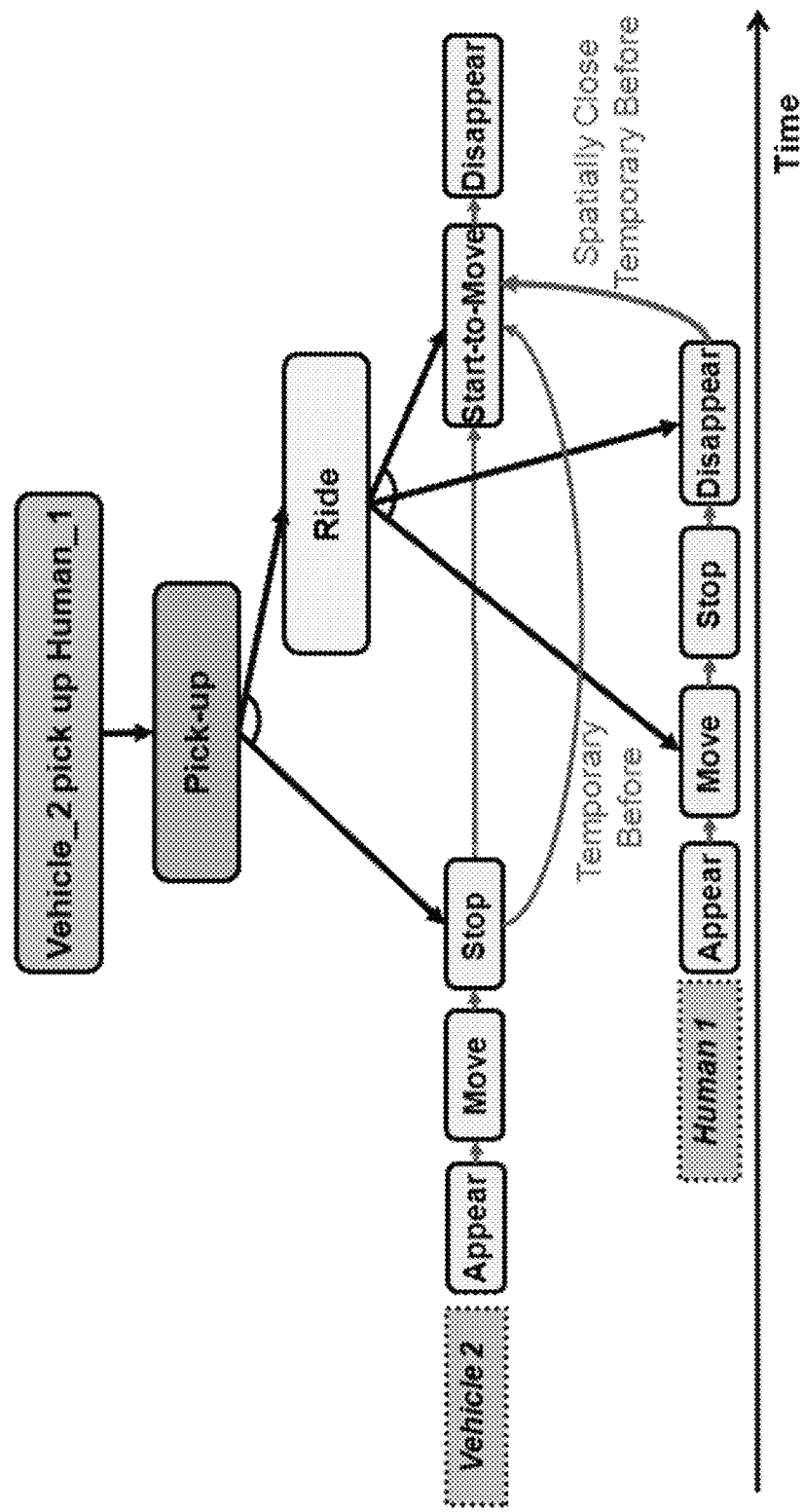
FIG. 3 illustrates an exemplary parsed graph of an event.

FIG. 3 illustrates an exemplary parsed graph of a pick-up event. When a vehicle appears in the scene and stops, a human approaches the vehicle and disappears, and then the vehicle leaves the scene, this event is defined by the pick-up event graph and represented to the parsed graph. This semantic reasoning may assist videos with both long-term and short-term activities to be matched robustly.

Events may be grouped into grouped events. For example, after inferring pre-defined events, a pair of events is again connected by checking spatial or temporal relationship of those events. By doing so, spatially close events or temporally sequential events may be connected to each other to build a grouped event. This can be an important step to track unknown events and to discover presumably higher-order complex events.

The above scene element extraction, action recognition, event recognition, and relational graph formation process is only one example of how a scene including an event such as a grouped event may be represented as and formulated into a graph. Other methods may be used as well.

Figure 4A:
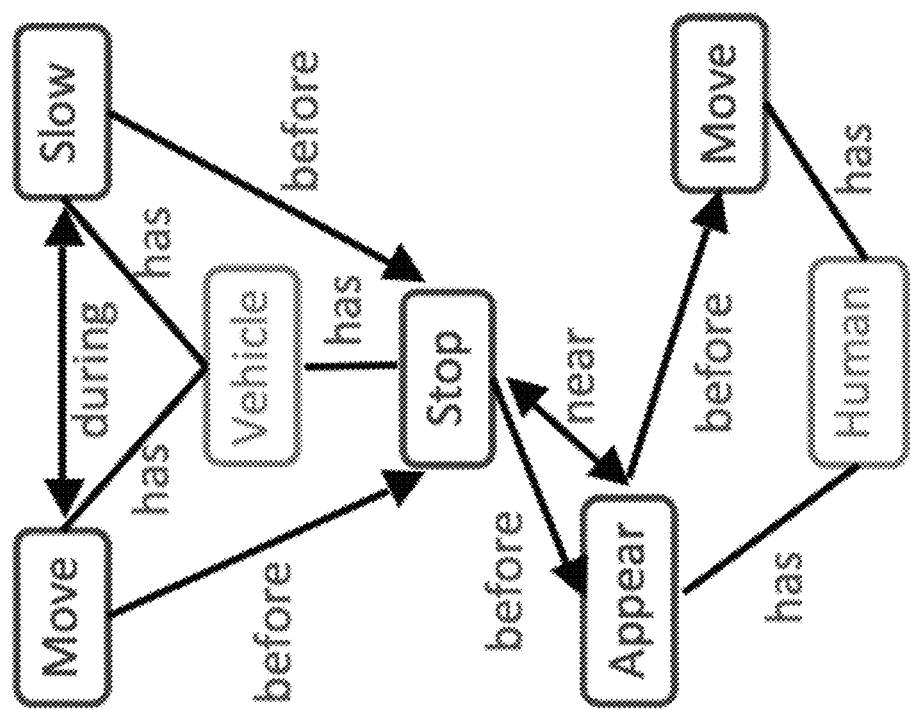
FIG. 4A depicts an exemplary relational graph for an exemplary event.
Figure 4B:
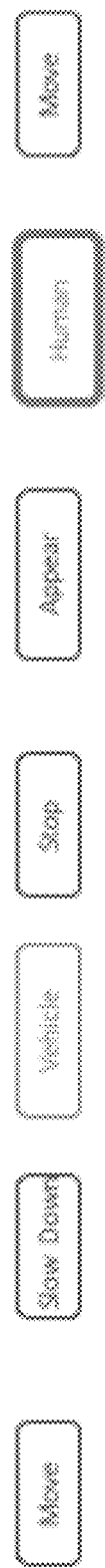
FIGS. 4B-4D depict exemplary subgraphs of the relational graph of FIG. 4A.
Figure 4C:
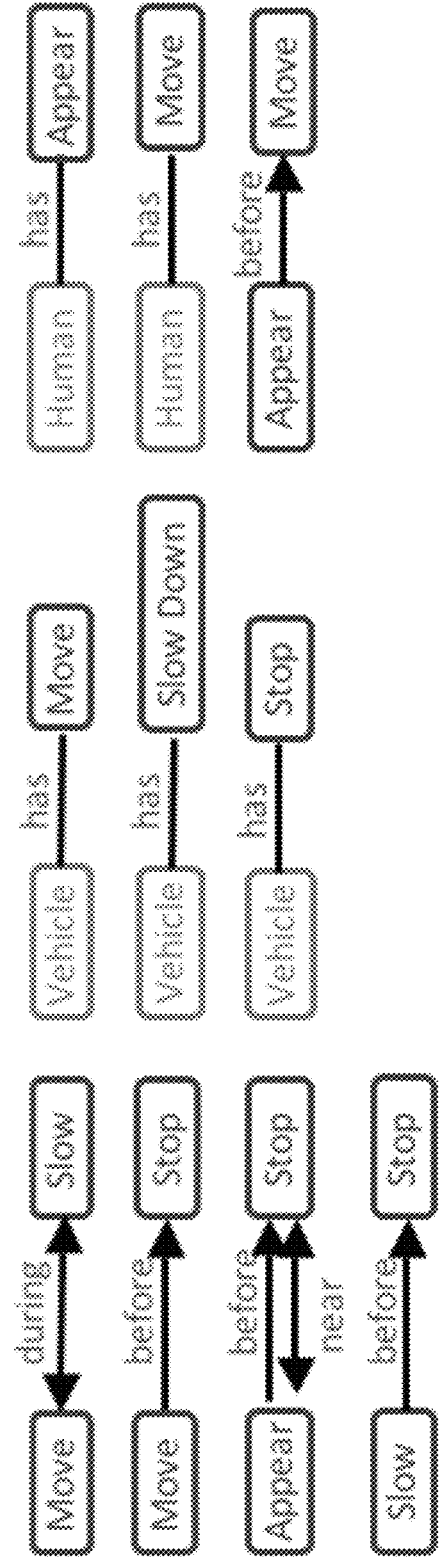
Figure 4D:
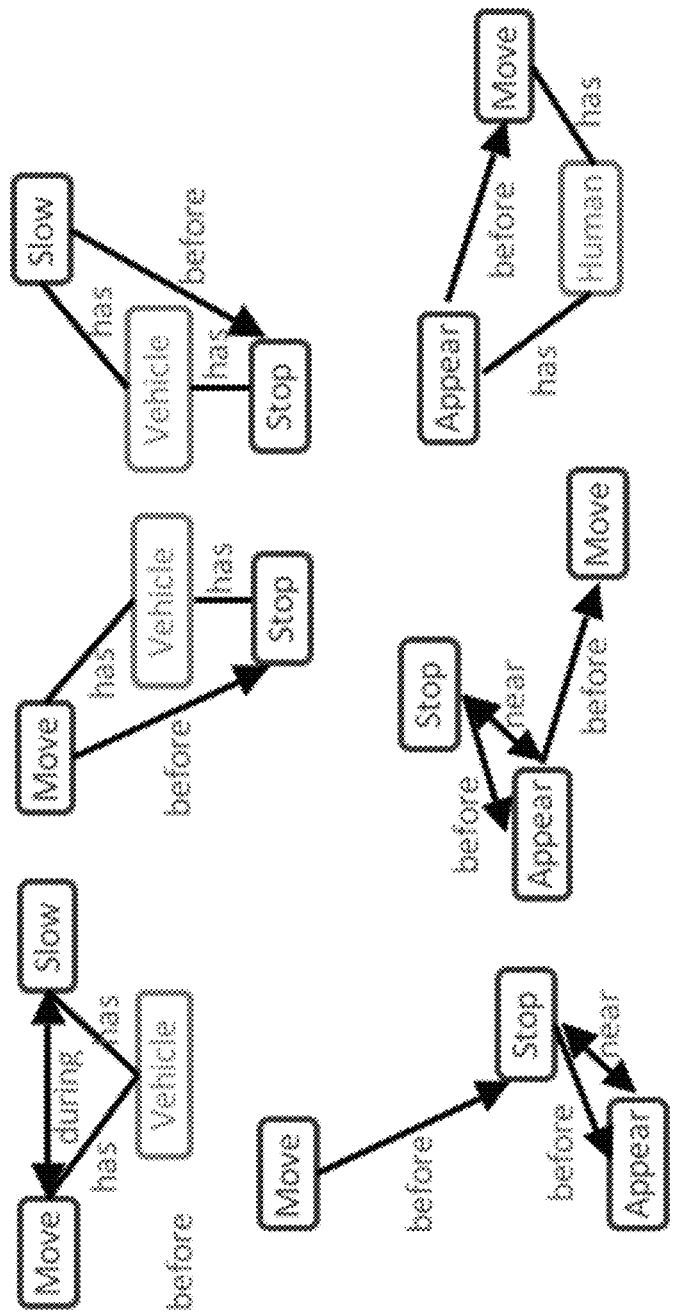

Video analysis and searching methods described herein may use subgraphs of relational graphs. FIG. 4A depicts a relational graph for an exemplary grouped, complex event (e.g., a disembark event). FIGS. 4B-4D depict exemplary subgraphs of the relational graph of FIG. 4A.

A graph G=(V, E) may be defined by a set of nodes, or vertices, V and a set of edges E. The order of a graph refers to the number of nodes in the graph. A graph G may be decomposed to subgraphs. Sets of subgraphs can be formed, each set including subgraphs of a particular type or order. For example, a set of one-node subgraphs is shown in FIG. 4B, a set of two-node subgraphs is shown in FIG. 4C, and a set of three-node subgraphs is shown in FIG. 4D. Each subgraph may be extracted from the complete relational graph, such as shown in FIG. 4A. One-node subgraphs may be the nodes of the relational graph. A multi-node subgraph may be comprise nodes of the relational graph and edges formed therebetween in the relational graph, to represent a part of the relations set forth in the relational graph. In the example of FIG. 4C, each two-node subgraph includes two nodes connected with one edge. A plurality of these, such as all possible two-node subgraphs, or a subset of possible two-node subgraphs of the relational graph may be extracted. In the example of FIG. 4D, each three-node subgraph includes three nodes connected with three edges. A plurality of these, such as all possible three-node subgraphs, or a subset of possible three-node subgraphs of the relational graph may be extracted. Also, not all three-node graphs need to include three edges. Further, a subgraph can include only a single edge, or a node and a connected edge without additional elements. In general, groups of subgraphs having the same number of nodes may be referred to as n-node subgraphs. Note that as higher ordered groups of subgraphs are extracted, the number of total possible subgraphs increases in an exponential manner. Thus, performing an analysis based on a comparison between all possible subgraphs of a relational graph, or even between large sets of higher-order subgraphs, can consume significant processing and storage resources.

In certain embodiments, a plurality of subgraphs of different orders are extracted, and after a set of subgraphs is extracted, each extracted subgraph is indexed and saved in a subgraph feature vocabulary.

In conventional systems, a set of subgraphs of existing grouped events (e.g., stored subgraphs) may be compared to a set of subgraphs extracted from a particular grouped event. Each stored subgraph would need to be compared to each extracted subgraph to perform a comparison. Thus, the number of variables (e.g., subgraphs) to be compared may depend on both the number of subgraphs of the existing grouped events and the number of subgraphs of the particular grouped event. A set of subgraphs that includes p subgraphs (e.g., p variables) may be described as being p-dimensional.

One aspect of the disclosed embodiments includes dimension reduction. Dimension reduction can be described as converting a first set of p variables to a second set of k variables, where k and p are integers and k<p, each variable of the second set being derived from plural variables of the first set. Variables of the second set may be a different type of variable than variables of the first set (although variables of the second set may be composed of variables of the first set). A discussion of dimension reduction in the context of video-derived relational graph comparison is described in greater detail below.

In certain embodiments, the number of subgraphs used to perform a comparison between a given video event represented by a relational graph and a plurality of stored events represented by other relational graphs may be greater than the number of variables actually compared when performing the comparison.

Certain aspects of graphing and subgraphing will now be described. Given a query graph, $G_q$, finding the closest graph from graphs in database, DB, may be determined by maximizing energy function E.

$$Q(G_q) = \max_{r \in DB} E(G_q, G_r), \qquad (1)$$

where $G_r$ is one of the graphs in the graph repository DB. A graph with maximum energy is selected as a matching graph. The energy function E may be defined as subgraph matching:

$$E(G_q, G_r) = \sum_{a \in g_q, g_r} \theta_a x_a + \sum_{a,b \in g_q, g_r} \theta_{ab} x_{ab} + \ldots + \sum_{a,b,c\ldots n \in g_q, g_r} \theta_{abc\ldots n} x_{ab\ldots n}, \quad (2)$$

where E is the correspondence energy between two graphs, $G_q$ and $G_r$, $g_q$ is a set of subgraphs of $G_q$ and $g_r$ are subgraphs of $G_r$, $x \in (0,1)$ (x=1 when there is matching subgraph in both $G_q$ and $G_r$, x=0 otherwise) indicating corresponding subgraph features with one node $x_a$, two nodes $x_{ab}$ and n nodes $x_{ab\ldots n}$. in both $G_q$ and $G_r$. θ is a weight for the correspondence.

In Equation (2), the graph matching problem is decomposed by matching subgraphs with one node (first term), two nodes (second term) or n nodes (last term). More nodes in subgraph represent more complex relationships among the nodes. However, computational time and the number of subgraphs increase exponentially as the node size increases. More subgraphs can have more redundant and conceptually duplicated subgraphs. In one set of experimental results, discussed further below, subgraphs with one and two nodes were optimal on performance, speed, and memory for graph searches.

After indexing subgraphs, the equation becomes much simpler since a set of subgraphs in a graph are represented by a vector.

$$E(G_q, G_r) \approx E(g_q, g_r) = \sum_{\substack{q_i \in g_q, r_i \in g_s, \\ s=1 \ldots S}} \theta_s x(q_s, r_s) \quad (3)$$

where $q_s$ is an indexed subgraph in a query graph, $r_s$ is an indexed subgraph in database, the size of subgraph vocabulary is S, $x(q_s, r_s)=1$ when both $q_s$ and $r_s$ exist, 0 otherwise.

In Equation (3), an important factor is θ. When a node is a visual feature, θ can be appearance measure (shape context, SIFT, HOG, or color histogram, or bag-of-words in a bounding box of human, vehicle, or object) or geometric distance. When a node is a semantic node, θ can be ontological distance (the distance in an ontological family tree such as WordNet) or importance of the subgraph itself.

Rather than having one θ value for a corresponding subgraph, we set different values with respect to each graph. θ may be learned from the corpus of graph database, applying dimensionality reduction (e.g. tf-idf, pLSA, or LDA).

Tf-idf finds relationships between words and document using frequency in a document and inverse document frequency in a discriminative manner. In one embodiment, tf-idf builds a subgraph-by-graph matrix which defines correlation θ between subgraphs and a graph database.

$$\theta_{sv} = \frac{f_{sv}}{\max_{w \in v} f_{wv}} \cdot \log \frac{V}{|\{v \in V : s \in v\}|}, \quad (4)$$

where V is a graph corpus and V is its number, and $f_{sv}$ is frequency of subgraph s in graph v. The first term is subgraph frequency and the second term is inverse graph frequency. Unlikely having constant θ over a graph as shown in Equation (3), frequency and graph related matrix θ is defined. In one embodiment, however, the constructed matrix is too large and characteristics of documents are not captured.

Figure 5:
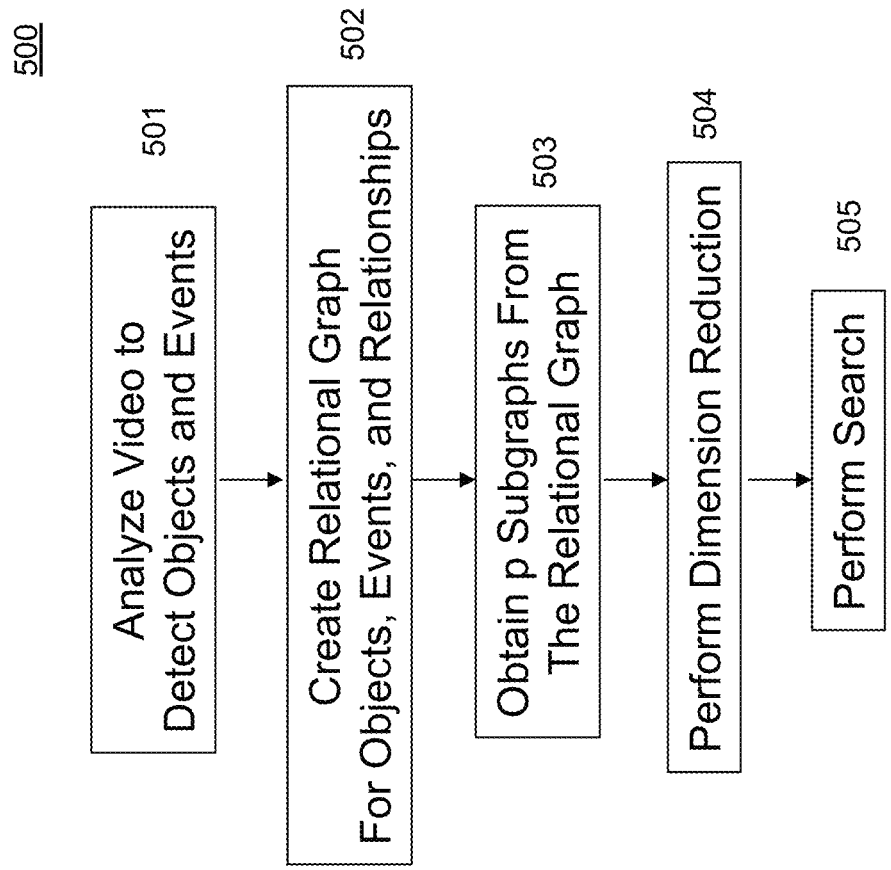
FIG. 5 shows an exemplary method of performing analysis and search of video, according to certain embodiments.

FIG. 5 shows an exemplary method 500 of performing dimension reduction for a graphical representation of a video that includes objects and events.

As shown in FIG. 5, in step 501, a video is analyzed to detect objects and events that exist in the video (e.g., agents, subjects, simple events, grouped events, etc.). Methods such as described above and in the aforementioned incorporated references may be used to implement the analysis. Though the example of a video and objects and events are used, this example may generally apply to an analysis of any set of related information.

Next, in step 502, in response to the analysis, a first relational graph is created for the objects and events. For example, the relational graph may include a number of nodes and edges that represent some or all of the objects and events and their contextual relationships to each other. For example, the nodes may represent objects and actions (e.g., vehicle, stop, human, appear, etc.), and each edge may represent a relationship between two nodes (e.g., before, after, during, near, human has appeared, vehicle has stopped, etc.). In one embodiment, all of the nodes and edges of the relational graph are stored in a database.

Next, in step 503, a plurality of subgraphs may be obtained from the first relational graph. For example, the subgraphs may be extracted from a database that stores the first relational graph. The number of subgraphs obtained may include p subgraphs. In one embodiment, for example, a plurality of 1-node subgraphs (e.g., all of the 1-node subgraphs in the first relational graph) and a plurality of 2-node subgraphs (e.g., all of the 2-node subgraphs in the relational graph) may be obtained from the first relational graph. Each obtained subgraph may be indexed, for example in a database. Though an example of all 1-node and 2-node subgraphs being extracted from a relational graph is given, additional or fewer orders of subgraphs may be extracted. Also, not all subgraphs of a given order need to be extracted. Regardless of which particular subgraphs are extracted, the set of subgraphs obtained can be said to include p subgraphs, p being an integer greater than 1. The p subgraphs represent p variables. Steps 501, 502 and 503 may be performed for multiple videos, such as training videos.

In step 504, dimension reduction is performed on the p subgraphs. Dimension reduction may be performed by analysis of the subgraphs obtained from relational graphs of a plurality of training videos. Generally speaking, the dimension reduction may result in obtaining k variables, where k is an integer greater than 1 and less than p. Each of the k variables may be associated with a vector (e.g., a [1×m] or [m×1] matrix of m sub-variables). For example, in one embodiment, subgraphs are grouped into k groups, and each group being represented by a vector and corresponding to one of the k variables. For example, each vector of the group may comprise a vector of p weights, with each weight corresponding to each of the subgraphs. Or each group may comprise an identification of only some of the subgraphs with corresponding weights.

Figure 10A:
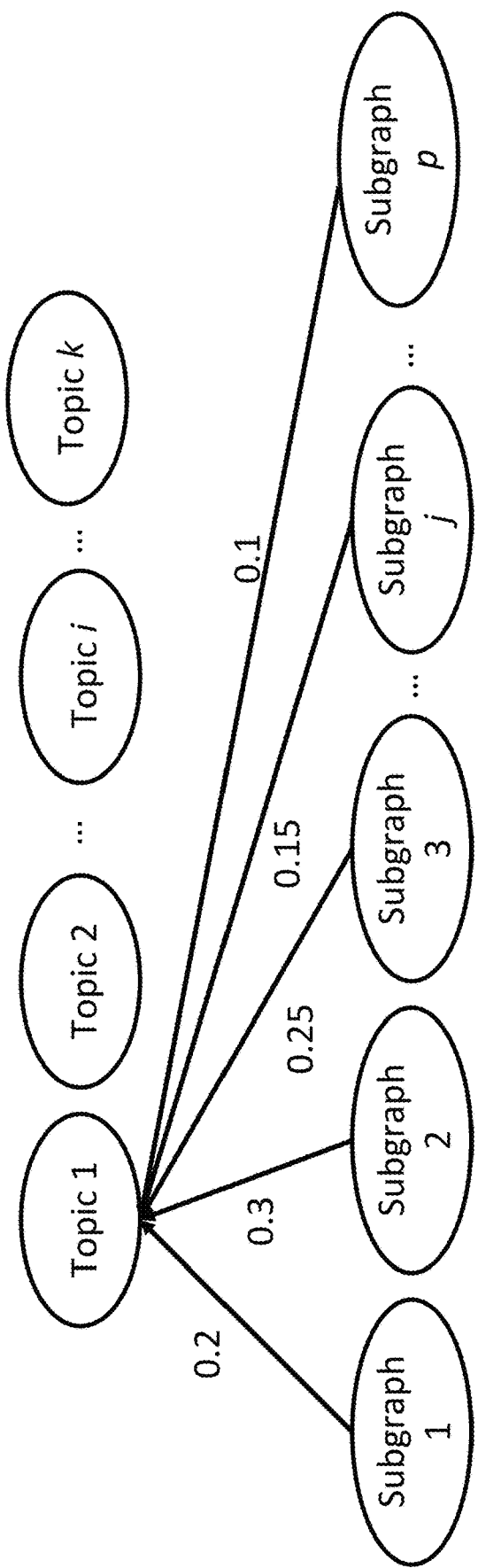
FIG. 10A illustrates k topics with Topic 1 being identified by p weights.
Figure 10B:
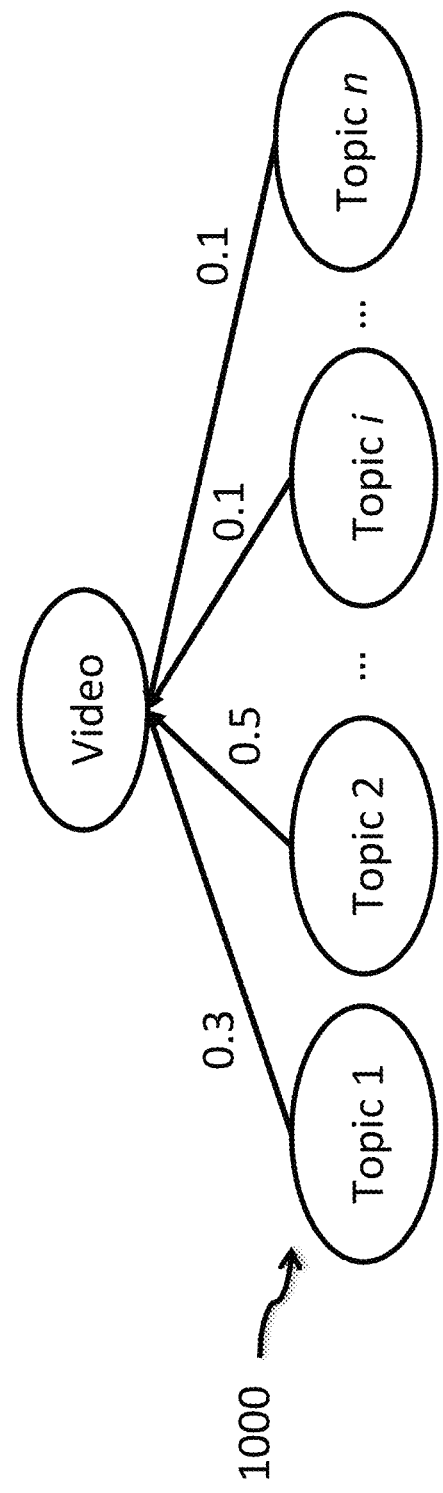
FIG. 10B illustrates a video and an associated topic vector.

In one embodiment, the dimension reduction comprises topic modeling, wherein a number of k topics are determined and selected from a larger group of potential topics by review of a plurality of learning videos (to analyze subgraphs obtained therefrom). Each topic may be identified by a group of one or more of the p subgraphs. For example, FIG. 10A illustrates k topics Topic 1 . . . Topic k. Topic 1 is identified by the p weights (0.2, 0.3, 0.25, 0.15, . . . 1) each associated with a corresponding one of the p subgraphs and may be stored as a vector of these weights. As shown in FIG. 10B, each of the videos may be represented by weightings of the k topics, which may form a topic vector 1000. In FIG. 10B, the video is associated with a topic vector 1000 comprising weights of 0.3, 0.5, . . . 0.1, . . . 0.1 respectfully corresponding to the 1 to k topics. The weights of each of the k topics for a topic vector may be obtained by comparing the weighted subgraphs associated with the topic with the subgraphs of the selected video. Topic modeling will be described in greater detail below. Although topic modeling is implemented in exemplary embodiments described herein, other dimension reduction techniques may be used. Dimension reduction may comprise principal component analysis, factor analysis (including principal factor analysis and maximum likelihood factor analysis), projection pursuit, independent component analysis, non-linear principal component analysis, random projections and non-linear methods and extensions (see, e.g., I. Foldor, "A survey of dimension reduction techniques," by Imola K. Fodor, Center for Applied Scientific Computing, Lawrence Livermore National Laboratory, the contents of which are hereby incorporated by reference in its entirety).

In step 505, a search may be performed using the k variables. When the variables are topics, the search may be performed using the k topics. For example, in one embodiment, a topic vector may be obtained for each video, the topic vector for each video comprising a vector of the k weightings for each of the k topics. The weighting for each topic of a topic vector may be obtained by analysis of the subgraphs associated with that topic in the video corresponding to the topic vector. Topic vectors associated with the analyzed video may be stored in a database, and later may be searched for if a video search query for a similar video is initiated. Or, if the analyzed video forms a search request, then a topic vector of a particular video (or several videos selected by a user as having shared feature(s) of interest) may be used as a search query, and may be compared to stored vectors to determine a match. FIG. 10C illustrates Video 1 being compared to Video 2 by comparison of the topic vector 1001 of Video 1 with the topic vector 1002 of Video 2. For each of the k topics, each of the topic weights of vector 1001 is compared to a topic value of vector 1002. There are many ways to compare similarities of the topics such as (for the weights shown in FIG. 10C):

L1 distance=$|0.3-0.4|+|0.5-0.4|+ \ldots +|0.1-0.1|+ \ldots +|0.1-0.1|$ (where a lower resulting sum indicates higher similarity as compared to a higher resulting sum)

L2 distance=$\text{sqrt}((0.3-0.4)^2+(0.5-0.4)^2+ \ldots + (0.1-0.1)^2+ \ldots +(0.1-0.1)^2)$ (where a lower resulting sum indicates higher similarity as compared to a higher resulting sum)

Cosine distance=$0.3\times 0.4+0.5\times 0.4+ \ldots +0.1\times 0.1+ \ldots +0.1\times 0.1$ (where a higher resulting sum indicates higher similarity as compared to a lower resulting sum)

However, such similarity comparisons are exemplary and others may be used. The similarity comparisons are used to determine whether the compared videos are similar and to what extent. If two videos are considered similar enough to each other (e.g., a comparison results in a similarity value passing (below or exceeding) a certain threshold, or a similarity value indicating one of the most similar videos of a group of videos subject to the video search query), the videos may be retrieved (e.g., automatically or provided as a list to a user for selection) and reviewed by a user.

Videos of interest (e.g., showing a certain level of similarity with the search query) may be retrieved. Other resulting actions may include issuing an alarm or sending a notification. For example, in investigating criminal activities, it may be too complicated for a police officer to program a video analytics system to detect a particular pattern of behavior to detect the same in a video search. For example, a group of criminals may sell illegal drugs using a method of using one or more members to be on a look-out for police at one location, one member to collect the money from a buyer for purchase of drugs at first location and another member to pass the drugs to the buyer in second location. The buyers may typically arrive by car stop at the first location for 10 to 30 seconds move to the second location and stop for 4 to 10 seconds. The look-out members may typically be young. Other similarities may exist to help identify this behavior. However, such similarities may be difficult to instruct a video analytics system to search for in videos (and further, some of the similarities may be not known to the police officer). In using embodiments described herein, the police officer may instead submit a video with the activity of interest (e.g., here, the purchase of drugs) as a search query. The submitted video may then be compared to other videos as described herein to identify similar videos that may be retrieved and reviewed by the police officer. The videos that are searched may be stored or obtained in real-time and analyzed in real-time via the query (i.e., real-time comparison of topics of the video query with the real-time video). As will be understood, after performing topic identification using one set of videos, topics resulting from this topic identification may be used to search other videos not part of this set of videos.

Figure 11:
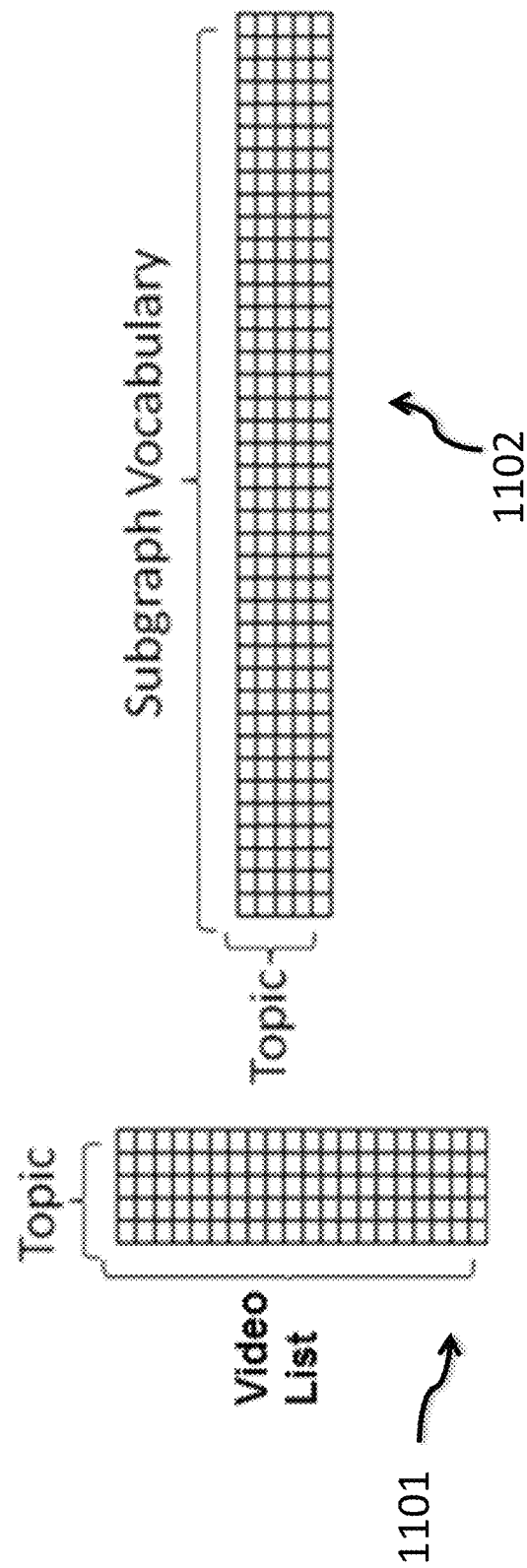
FIG. 11 illustrates the storage of video data and associated data structures.

By performing the dimension reduction from p to k variables, (such as using topic modeling for example), videos can be searched for using fewer variables, thereby reducing the complexity of the search that resources need to perform the search. In the Example of FIG. 11, the video data may be stored in computer storage medium as a Video List as a first matrix 1101 (a video by topic matrix), with each row of the Video List describing a video and comprising a topic vector storing weightings of each of the k topics associated with one of the videos of the video list (e.g., each column of corresponding to a particular topic with entries therein being an associated weighting with the corresponding topic). In addition, each of the topics may be stored in computer storage medium as a matrix 1102, with each row describing a topic and comprising a vector of weightings of each of the p subgraphs as the "Subgraph Vocabulary" (e.g., each column associated with a subgraph with entries therein being an associated weighting with the corresponding subgraph). Alternatively, the Subgraph Vocabulary may take other forms and identify a subset of p subgraphs. Videos may be compared only by analysis video by topic matrix 1101 (e.g., by comparing topic vectors of two videos). The subgraph-by-topic matrix 1102 may be used to analyze each video for each of the k topics to provide a weight for each of the k topics to generate a row entry (topic vector) of video by topic matrix 1101. The subgraph-by-topic matrix 1102 may identify the topics by listing a weight for each of the subgraphs, the weights of the subgraphs being used to determine similarities of the corresponding topic with a video.

Figure 12:
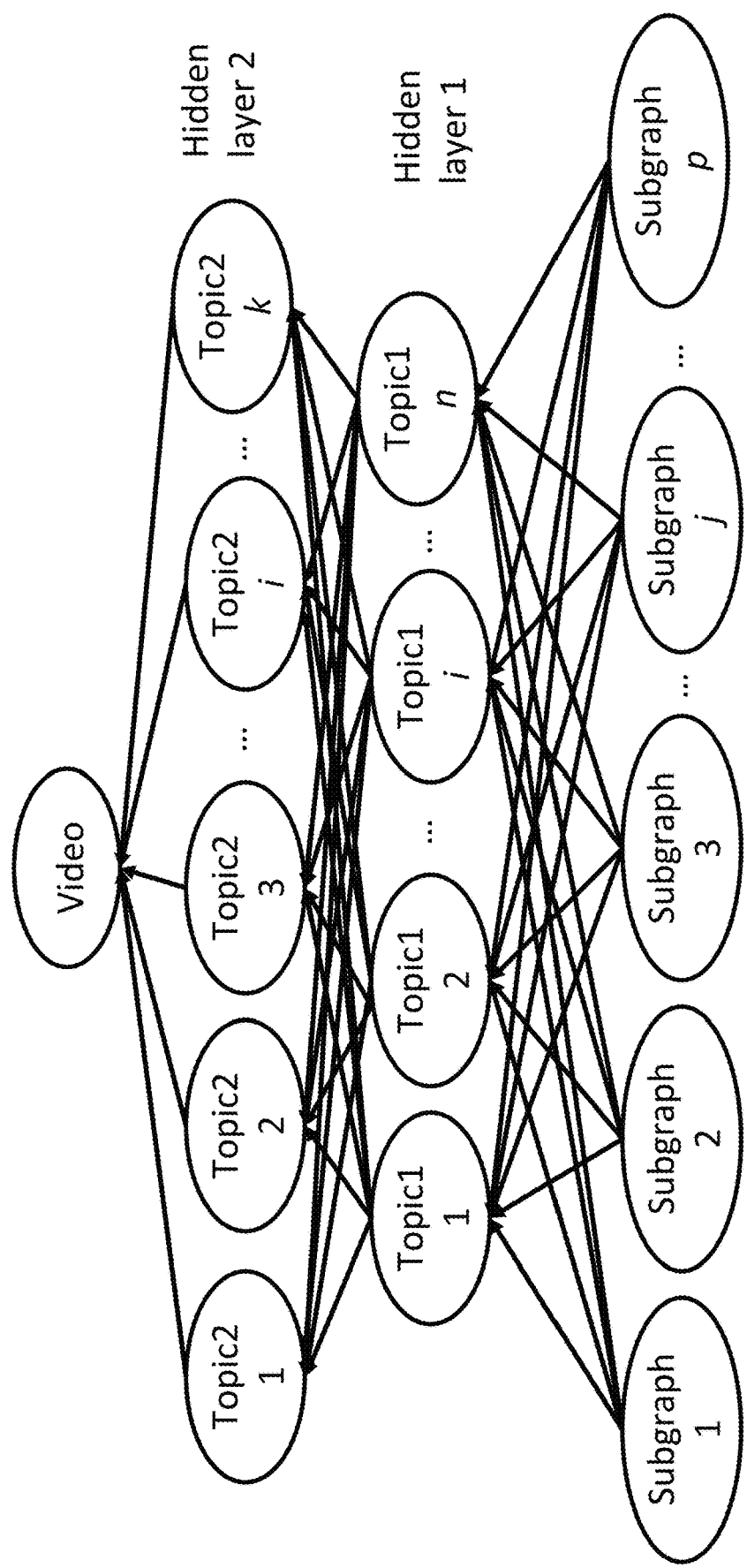
FIG. 12 illustrates an alternative where topics may be derived from other topics.

In some alternative embodiments, the k topics representing a video (e.g., the topic vector) may be derived from other topics, which in turn are derived from subgraphs. FIG. 12 illustrates a Video represented by a topic vector 1003 comprising weightings for topics Topic21, Topic22, Topic23 . . . Topic2n, these having been derived by topic modeling of Topics 11, Topic12, . . . Topic 1n. Topics 11, Topic12, . . . Topic 1n may have been derived from subgraphs 1, 2, 3, . . . p as described above.

An example of topic modeling and searching based on topic modeling will now be described in connection with FIGS. 6A and 6B.

Figure 6A:
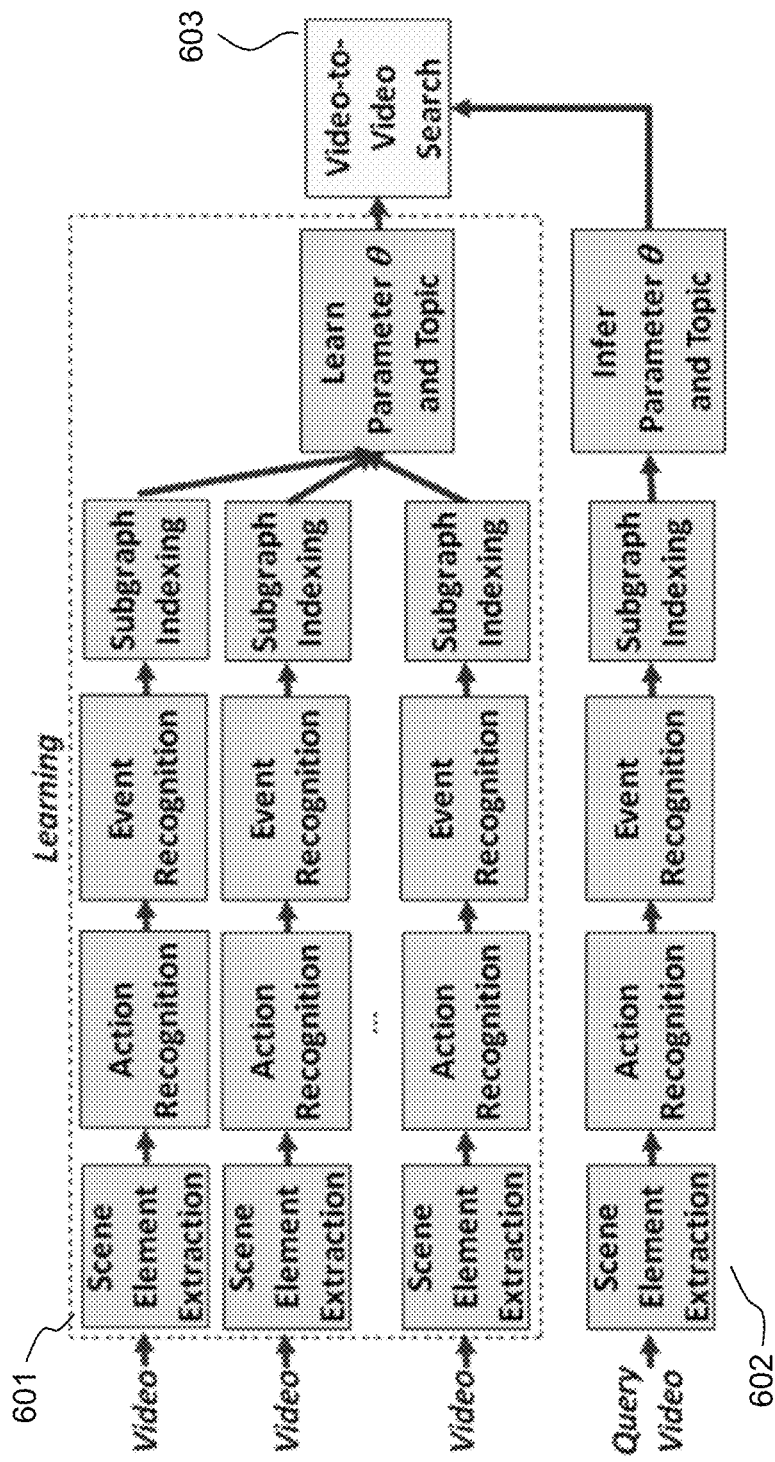
FIGS. 6A and 6B show exemplary topic modeling and searching based on topic modeling, according to certain embodiments.

As shown in FIG. 6A, by analyzing a plurality of videos, and detecting events of those videos, certain topics that relate to groups of subgraphs may be formed. In one embodiment, the topics are learned, based on the set of stored relational graphs that correspond to respective events. For learning, also referred to as training, in one embodiment, each video is fed to one or more processors and processed to detect scene elements, actions, and complex events by parsing grammar. The detected events are described in parsed relational graphs, and subgraphs are built and indexed. In one embodiment, for example, these processes may be performed in a distributed computing system using a Map-Reduce framework for a fast and reliable system. After the subgraphs are indexed, the subgraph features are learned to extract topics and learn parameters. The topics may correspond to groups of subgraphs. The parameters may correspond to different relationships between graphs and topics, or topics and subgraphs. These steps are shown as 601 in FIG. 6.

One example of topic modeling includes, for example, probabilistic latent semantic indexing (pLSA), described for example in [T. Hofmann, "Probabilistic latent semantic indexing," Proceedings of the Twenty-Second Annual International SIGIR Conference, 1999 (referred to herein as "Hofmann"), which is incorporated by reference herein in its entirety. In this type of modeling, to reduce a large scale matrix and determine characteristics of each graph in database, a graph is modeled by a set of latent variables (e.g., topics) which is built from a Gaussian mixture of subgraphs. This mixture model divides a large subgraph-by-graph matrix to two smaller matrices, subgraph-by-topic and topic-by-graph. One drawback of pLSA may be that the number of parameters increases as data size increases, which may cause overfitting and may require more time for re-learning new data sets.

To address some of the drawbacks of pSLA, a different type of topic modeling, Latent Dirichlet Allocation (LDA) may be used. Like pLSA, LDA also reduces dimension, and models the topics. In addition, generative semantic meanings are modeled from a set of graphs and subgraphs. One advantage of LDA is that when a new graph is added in database, an update of the system can be faster and simpler than other methods. Applying LDA, the energy function for comparing relational graphs is simplified to compare topics rather than all subgraphs. In LDA, topic distribution θv={θv1, θv2, . . . , θvt . . . , θvT} is learned, where θvt represents relationship between graphs and topics. The learned dictionary may result in a matrix of topics and graphs, and other parameters, representing relationships between topics and subgraphs may be stored in a separate matrix.

A video search (which may include comparison of one video with one or more other videos) may be performed using the k topics without needing to perform a further analysis of the subgraphs. The search may comprise performing a comparison of a set of one or more search variables to the k topics without requiring a search of the subgraphs (or vector elements) comprising the topics. The search variables may comprise weightings of all or some of the k topics. For example, when a video is used as a search query, the k weightings associated with the k topics may constitute the search query.

In one embodiment, using LDA, all subgraphs are transferred to topics and topics are, again, indexed and modeled in a topic vector. As a result, subgraph matching is simply done by comparing topic distribution over graphs. The following equation can be used for this:

$$E(G_q, G_r) \approx E(T_q, T_y) = \text{Dist}(\hat{e}_v, \hat{e}_r), \quad (5)$$

Where $\theta_q$ is topic distribution vector of $G_q$ and $\theta_r$ is topic distribution vector of $G_r$. Dist(.) is the distance function between $\theta_q$ and $\theta_r$. The distance function can be L−1, L−2, Chi square, or earth mover's distance.

LDA has been used for modeling documents, scene categorization, object recognition, and activity recognition. See, e.g., Niebles; D. Blei, A. Ng, M. Jordan, "Latent Dirichlet allocation," Journal of Machine Learning Research, 3:993-1022, 2003 (referred to herein as "Blei"); L. Fei-Fei, P. Perona, "A Bayesian Hierarchical Model for Learning Natural Scene Categories," CVPR 2005 (referred to herein as "Fei-fei"); R. Fergus, L. Fei-Fei, P. Perona, A. Zisserman, "Learning object categories from google's image search," IEEE International Conference on Computer Vision, 2005 (referred to herein as "Fergus"); and Y. Wang, P. Sabzmeydani, G. Mori, "Semi-latent Dirichlet allocation: A hierarchical model for human action recognition", Workshop on Human Motion Understanding, Modeling, Capture and Animation, 2007 (referred to herein as "Wang"), each of which is incorporated in its entirety herein by reference.

For activity recognition, a video may be represented by visual features (Spatio-temporal HOG or SIFT) and a complex event may be learned from those set of features, called topics (or themes). However in typical LDA models, recognized activities are mostly simple gestures by a single human (e.g. running, jumping, or boxing), rather than complex grouped events which involves multiple agents and objects. With LDA all features may be considered as separate features, and the relationships of features may be ignored. In some examples, this topic learning approach may be applied while still keeping the relationship of feature pairs. For more detailed examples of LDA, see Blei, for example.

Other types of dimension reduction may be used, including other types of dimension reduction that do not necessarily use topic modeling (e.g., tf-idf). In one embodiment, different subgraphs may be associated with a weight factor (e.g., based on their frequency of occurrence within the stored set of subgraphs obtained during learning, such as by analysis of all subgraphs obtained from relational graphs of multiple videos), and different topics may also be associated with a weight factor. A limited number of topics may be created. For example, the number of topics k, which may be 10, 100, 1000, or some other number, may be selected by a programmer. For example, the topics may be selected as the k topics having the highest associated weight of all determined topics. Subgraphs of an event may be determined to fit into a topic based on a relationship between other subgraphs associated with the same event (e.g., a temporal or spatial relationship). Also, subgraphs that occur frequently may be given a low weight, and subgraphs that occur infrequently may be given a high weight. In one embodiment, each subgraph is weighted and may be included in one or more topics. Subgraphs that occur frequently across the learning space (e.g., those subgraphs derived from analysis of multiple videos) may have a smaller weight and be included many topics (even in all topics in some cases). However, subgraphs that occur less often may be weighted more highly and may be included in only a few topics. Among a set of subgraphs, each subgraph's importance (which may correlate to its selectivity) may thus be determined by frequency. The estimation of frequency may be rather simple and the same weight may be assigned for each sub-graph having a same frequency. In addition, probabilistic methods (e.g. tf-idf, pLSA, or LDA) may be applied to determine the weight of each subgraph from graph database and to group the related subgraphs. See, e.g., Blei; Hofmann; and Slaton, McGill, editors, "Introduction to Modern Information Retrieval," McGraw-Hill, 1983 (referred to herein as "Slaton"), which is incorporated in its entirety herein by reference.

As a result of the subgraphs included in each topic, the topics themselves may be associated with a weight factor. The weight factors of the topics obtained by review of the training videos may be used to determine which topics to select to be used in subsequent analyses (selected topics for creating a topic vector for each video) and which may be ignored (topics not to be included in a topic vector). For example, the highest k weighted topics may be selected as valid topics, indexed (e.g., provided an identifying tag), and used as the set of topics that may be associated with a video. Each video may be reviewed to determine which of the selected topics may exist within the video to form a topic vector for that video. The topic vector may comprise a vector having weight entries corresponding to the selected topics. The topic vector of a video may also be used as a query (in whole or in part) to perform a search of other videos by performing a comparison with the topic vectors of the other videos.

The weight factors of the topics may be used when comparing topics during a search, such as using weight factors of topics as a function of determining similarities of videos.

Referring back to FIG. 6A, after a series of videos and events of those videos have been analyzed, and topics from the subgraphs of those videos have been learned and weighted, a search may be performed on a new video initially of unknown events, which results in retrieval of one or more matching video clips. For example, as shown in 602 of FIG. 6A, and as described previously in connection with FIG. 5, a search query may be entered (e.g., by selecting a clip of a video), and based on the search query, elements, such as objects in a scene, may be extracted, action recognition and event recognition may be performed, and as a result, a relational graph may be formed and subgraphs may be extracted from that relational graph. The subgraphs may then be indexed. Topics may be created based on the subgraphs, the topics having weights. Topics may be selected (e.g., as part of a feature vector). Then, in step 603, video-to-video searching may be performed, for example, by performing comparisons between topics associated with the search query (e.g., topics associated with a selected video clip) and topics of the searched video. Matching topics that have higher weights may indicate and/or result in higher ranked video matches. For example, a match value may be calculated for two videos by determining similarity of topics shared between each video and/or determining dissimilarity of topics between each video, which may include calculating a sum of weights of the topics that are shared between each video. The sum may represent a match value with a higher value correlating to higher indication of similarities between the videos.

Figure 6B:
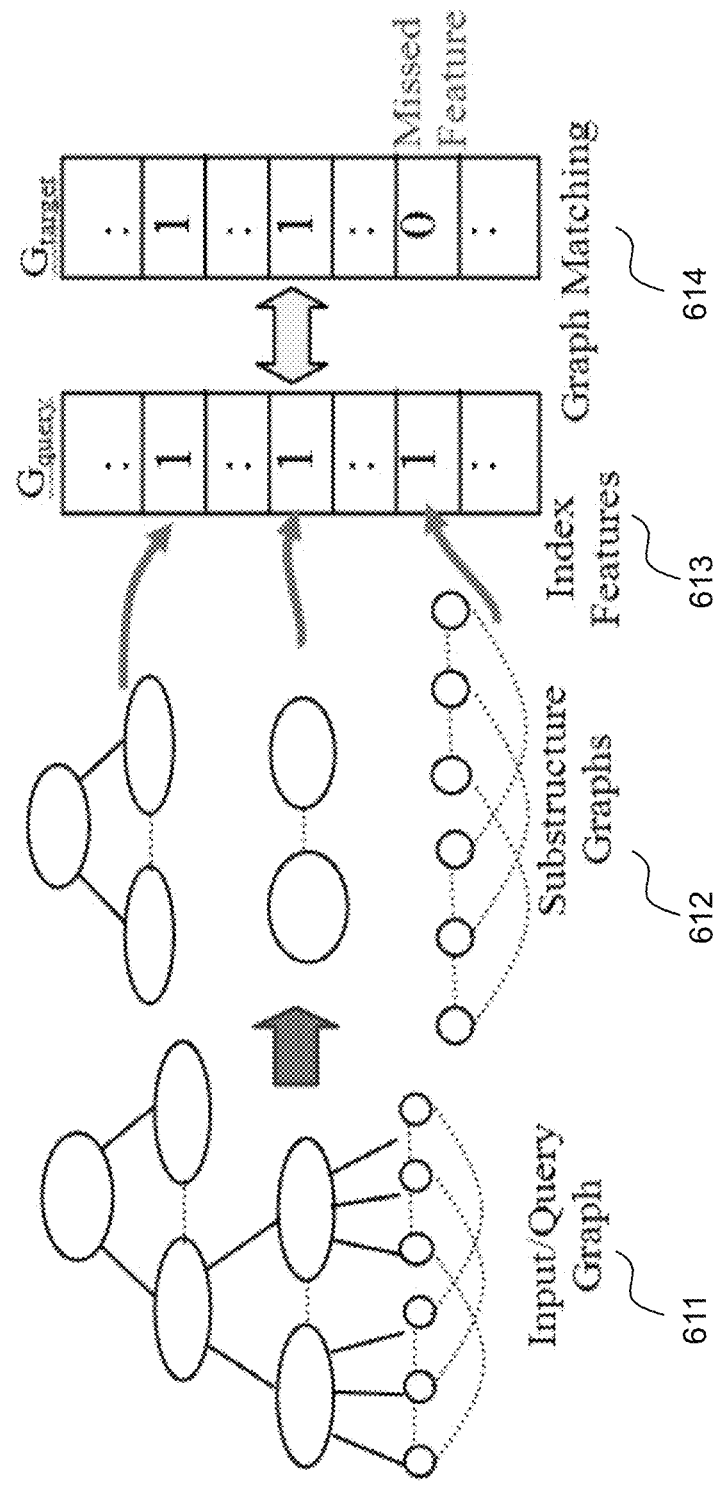

FIG. 6B illustrates an exemplary search method starting with a relational graph that results from a queried event of a video clip. The event may be modeled as a relational graph (611), the graph may be broken down into subgraphs which may be structured into groups (612), the subgraph groups (e.g., topics) may be indexed (613). These indices, modeled as vectors, may be compared with other indices and stored subgraph groups to determine if two relational graphs match (614).

In some of the embodiments, semantically closest information (e.g., video) from an information query which contains unknown grouped variables (e.g., video events) is retrieved. The information is analyzed and represented by a graph (e.g. And-Or Graphs (AOG)). In the case of video, the graph may provide visual elements, objects, and activities in the scene and describes their relationships. These relationships can be, for example, spatial, temporal, causal, or ontological. For efficient graph matching, the graph is further decomposed to sub-graphs and then indexed. The sub-graphs may be further learned and categorized using Latent Dirichlet Allocation (LDA), pLSA, Principal Component Analysis (PCA), or other dimensionality reduction methods. In some examples (1) unknown grouped video events with missing evidences may be represented by a set of subgraphs; (2) contrasting other subgraph matching algorithms, subgraphs may be grouped and matched by indexes after dimensionality reduction; and/or (3) the weights of subgraphs may be learned based on their importance in video event corpus. Benefits of this method includes: (1) Unknown and untagged grouped events can be matched; (2) Videos with both long and short duration events can be analyzed and matched by semantic reasoning; (3) Even though a video analyzer may fail in finding an exact event match, the sub modular activities of the event can be matched to find a similar event; and (4) The combination of dimensionality reduction and subgraph matching reduces a disadvantage of conventional methods and boosts the synergy of their advantages.

More particularly in connection with videos, given a video as a query, videos may be retrieved that contain similar complex activities with the query video. Exemplary processes and systems may (1) retrieve relevant data efficiently in a very large scale of video data; (2) be robust to video noises (e.g. scale, occlusion, and view-point changes) and systematic noises from not-so-perfect state-of-the-art object detection and tracking methods; and/or (3) model any possible complex events even with a limited number of semantic expressions of video events. As a result, videos from large data stores can be automatically searched for simply by submitting a video clip, and similar videos can be retrieved, without the need for human interaction other than in some embodiments setting a dimension reduction desired size.

EXPERIMENTAL RESULTS

To test some of the above methods, in one experiment, 262 web-collected surveillance video clips including a VIRAT dataset were used (see S. Oh et al., "A Large-scale Benchmark Dataset for Event Recognition in Surveillance Video," CVPR 2011 (referred to herein as "Oh"), which is incorporated in its entirety herein by reference). The play time of each video clip was around 2 minutes and video clips were mostly taken at different sites at different times. Among them, 212 videos were selected for training and database videos and 50 other video clips, from which majority of human annotators could select their closest video in database, were selected as test query videos. In the query videos, the events included basic actions (e.g. "vehicle-passing-by")

as well as grouped events (e.g. "vehicle parks, a human_A gets off, unloads box, human_B meets human_A, human_A hands over a box to human_B, human_B disappears, human_A rides in the car, the car disappear.").

After processing the training video dataset, the number of one-node subgraphs was 33, that of two-node subgraphs was 1384, and that of three-node subgraphs was 37431, as shown in FIG. 7A.

Figure 7B:
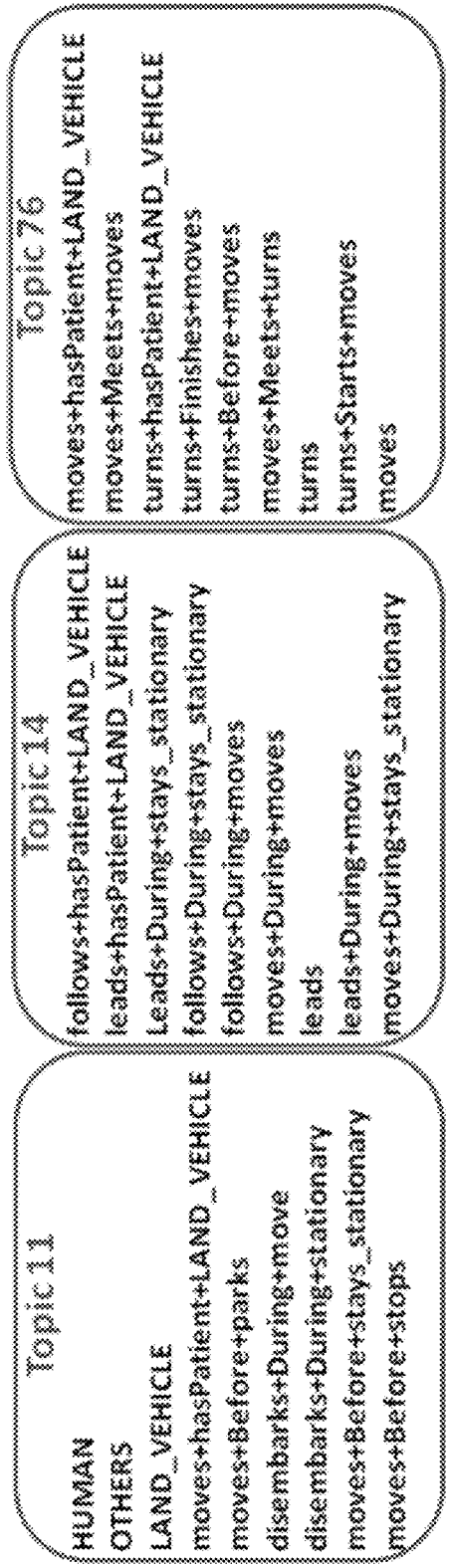

Performance was evaluated with different topic sizes from 10 to 1000, the performances were initially quite similar, with 100 topics giving the best result. Therefore, a topic size was set to 100. The example of extracted topics after applying LDA is shown in FIG. 7B. As shown, Topic_11 includes subgraphs with events with human and vehicle. Topic_14 is related to vehicles' lead/follow events. Topic6 includes a vehicle's turning events.

Different video event retrieval algorithms using subgraph indexing were used. Variations in (1) subgraph node sizes, (2) weighting and grouping schemes with tf-idf, pLSA, and LDA, and (3) distance functions were used. Experiments were conducted with all three dimensions, but only some of them are shown below.

Experiment 1

Figure 8A:
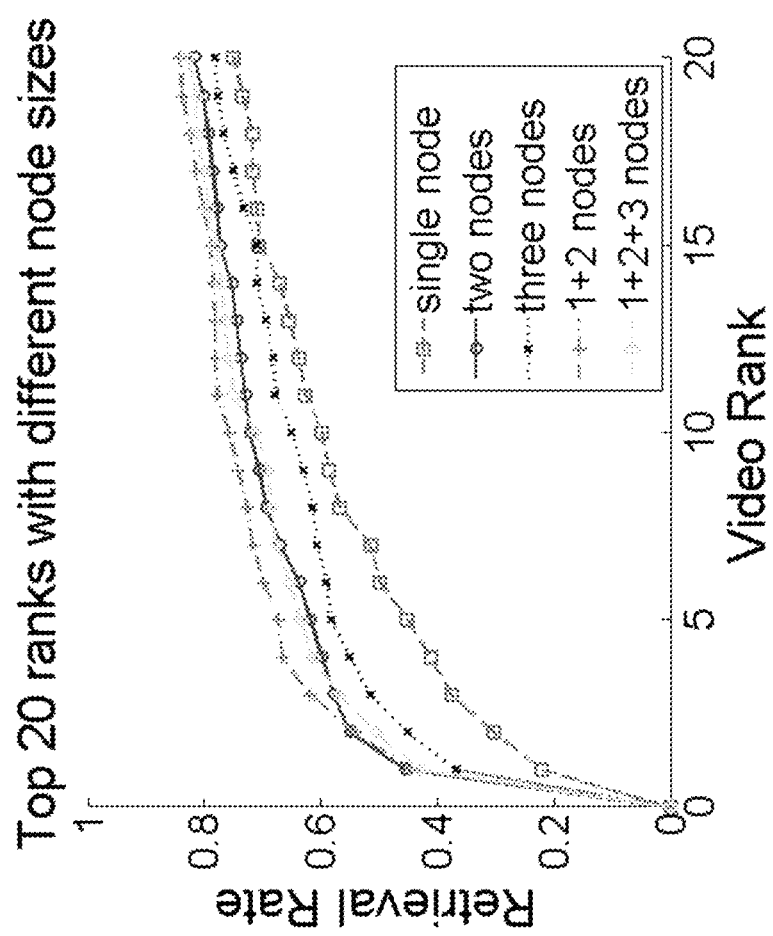

In one experiment, retrieval rates based on the inclusion of sub-graphs having different node sizes were compared. This experiment used LDA. As shown in FIG. 8A, experiments were performed using only subgraphs having a single node, using only subgraphs having two nodes, and using only subgraphs having three nodes. Additional experiments were performed for using all subgraphs having one or two nodes, and using all subgraphs having one, two, or three nodes. The retrieval rate with different node sizes is shown in FIG. 8A.

As shown, the retrieval rate shows the correct matching rate between query video and corresponding searched-for video as the retrieved rank increases. From the evaluation results, it is shown that the method with a single node, wherein the relationship of nodes is ignored, gave the worst results. On the other hand, the method that used only subgraphs with a single node and two nodes gave best results. As can be seen, the performance gets slowly worse as the node size increases. One reason for this may be that though the larger size of nodes captures higher-order relationships, it exponentially increases the number of subgraphs, such that the subgraphs are more conceptually duplicated and become less discriminative across a video corpus.

Experiments were conducted with tf-idf and pLSA with varying node sizes and they provided the same trend, where one+two nodes gave the best retrieval rate.

Experiment 2

Figure 8B:
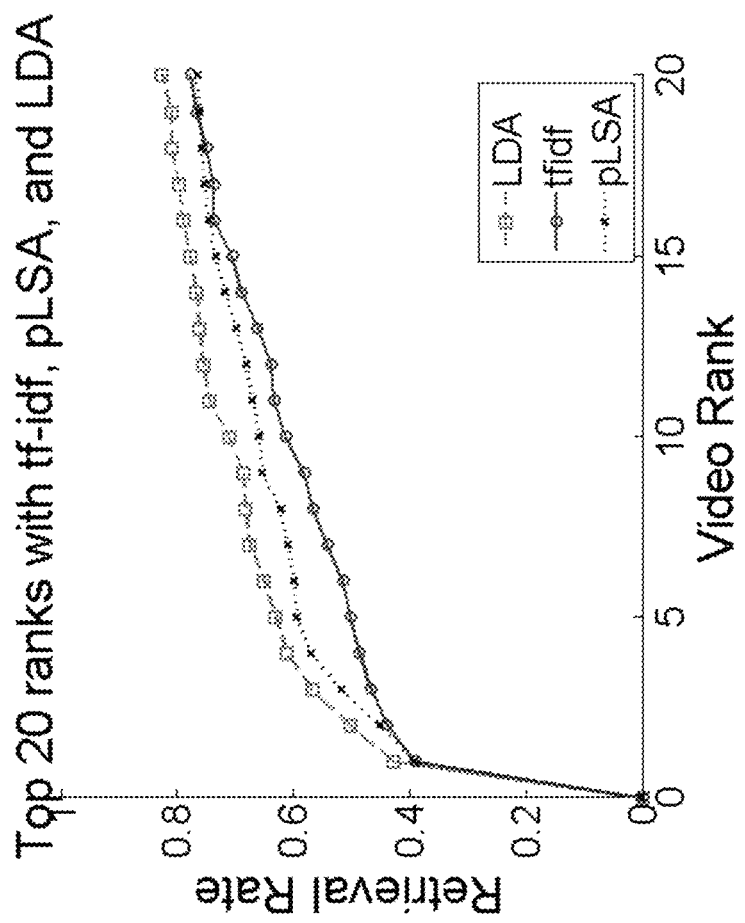

In a second experiment, different dimension reduction methods were used, including tf-idf, pLSA, and LDA. This experiment used one- and two-node subgraphs. The performance of tf-idf, pLSA, and LDA are shown in FIG. 8B. The experimental results show that the use of LDA modeled video events best among three of them.

For example, using LDA with 1+2 nodes, 22 out of 50 (44%) videos were correctly retrieved as a first rank and 40 videos (80%) were correctly retrieved within top 20 ranks, which was shown in a first page of the browser-based video retrieval system used. Another 10 videos retrieved with lower ranks were videos containing only common events which most of the database videos contained, such as car-passing-by or human-walk.

Experiment 3

Five different distance functions of LDA's topic distributions or tf-idf's subgraphs in Equation (1) were compared: Euclidean, Earth mover distance, Cosine, L1, and Chi square. Their performances are shown in FIG. 8C. LDA with Chi square and L1 distances gave the best results among five distance metrics. The results were similar for pLSA.

Examples of a query and best two matching videos are shown in FIGS. 9A-9C. The query video shown in FIG. 9A contains, "a car appears, the car stops, a human gets out of the car, the human comes back to the car, the human gets into the car, the car goes away." After subgraph matching, the first ranked video is shown in FIG. 9B, which has the same event and includes some other events (e.g., "other vehicles are parked."). The second ranked video, shown in FIG. 9C, has similar events. However two vehicles and two persons are involved. Since substructures of a graph are matched, a set of graphs with similar subgraphs can be extracted with a high matching score. However, since FIG. 9B keeps more structurally similar relationships among the nodes, it gets a higher score than a set of subgraphs for FIG. 9C.

In the experiments conducted, the average time of processing a query video was around 10 minutes for a 2 minute video using 2.8 GHz Intel Xeon CPU, where most of the time was spent on video analysis and basic action recognitions. For pre-processed query videos, the retrieval time was less than 1 second.

For additional information relating to certain of the description discussed above, see X. Yan, P. S. Yu, and J. Han, "Substructure Similarity Search in Graph Databases," SIGMOD, June 2005, which is incorporated herein by reference in its entirety.

The embodiments described above improve existing video searching systems by providing automated review and search of events captured in video. However, the embodiments described above can be used for various fields outside of video analysis. In one alternative, embodiments described herein may be applied to cheminformatics. For example, a database may be provided associating chemical compounds and information (e.g., articles, descriptions, side effects, warnings, uses, etc.) associated with the chemical compounds. A relational graph may be generated for each compound, and subgraphs generated from the relational graph. The group of subgraphs may be subject to dimension reduction with the resulting reduced set of variables used to perform searches (e.g., comparisons between compounds to find similarities between compounds). For example, topics may be identified using topic modeling, compounds may be associated with topics to obtain a topic vector for each compound, and topic vectors may be used to compare compounds (as described herein for videos). The resulting similarities may result in determining efficacy, dosage amounts, possible side effects, alternative uses, etc. of compounds.

In another embodiment, the embodiments may be applied to bioinformatics. For example, biological elements, such as nucleotide and amino acid sequences, protein domains and protein structures may be associated with various data (e.g., articles, descriptions, uses, etc.). Relational graphs may be obtained for each biological element, and subgraphs may be obtained therefrom. The group of subgraphs may be subject to dimension reduction with the resulting reduced set of variables used to perform searches (e.g., comparisons between the biological elements to find similarities, to predict structure, use, etc.). For example, topics may be identified using topic modeling, biological elements may be associated with topics to obtain a topic vector for each biological element, and topic vectors may be used to compare biological elements (as described herein for videos). The resulting similarities may result in determine similarity in uses, similarities in structure, etc. of the biological elements.

In another example, in video surveillance, they can be used to search for possible criminal or terrorist activities, to monitor and improve traffic design, or for general investigation of events of interest. The embodiments can be used in other video fields, such as news, movies, personal videos, etc., either stored on a private computer or network or on a public network such as the Internet. In addition, the embodiments can also be applied in other systems, such as object detection, target tracking, modeling social networks, or protein structure comparisons.

Although a few exemplary embodiments have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

We claim:

1. A method of performing video searching, comprising:
maintaining a storage of a plurality of grouped events in the form of a plurality of corresponding relational graphs, each relational graph having a number of subgraphs;
for at least a first grouped event having a corresponding first relational graph, extracting and indexing a first set of subgraphs including a plurality of subgraphs, the first set of subgraphs including at least one subgraph having at least 1 node;
performing dimension reduction for the first grouped event to form a plurality of subgraph groupings, each subgraph grouping including a plurality of subgraphs of the first set of subgraphs;
receiving a search request for a video search, the search request for a portion of a video that includes at least a second grouped event; and
based on the plurality of subgraph groupings, determining that the second grouped event matches the first grouped event.

2. The method of claim 1, wherein the first set of subgraphs includes all subgraphs of the first relational graph having an order of 1 and all subgraphs of the first relational graph having an order of 2.

3. The method of claim 1, further comprising:
performing the dimension reduction by selecting a predetermined number of topics, wherein each subgraph grouping is associated with a respective topic.

4. The method of claim 3, wherein:
the predetermined number of topics is less than the number of subgraphs of the first relational graph.

5. The method of claim 4, wherein:
the predetermined number of topics is at least two orders of magnitude smaller than the number of subgraphs of the first relational graph.

6. The method of claim 5, wherein a particular subgraph is associated with a plurality of different topics and is weighted differently in at least one of the topics compared to the other topics.

7. The method of claim 1, wherein the second grouped event has corresponding second relational graph, and further comprising:
for the second grouped event, indexing a second set of subgraphs including a plurality of subgraphs, the second set of subgraphs including at least one subgraph having an order of 2; and
performing dimension reduction for the second grouped event to form a plurality of subgraph groupings, each subgraph grouping including one or more subgraphs of the second set of subgraphs,
wherein determining that the second grouped event matches the first grouped event further includes:
comparing the plurality of subgraph groupings of the second grouped event to the plurality of subgraph groupings of the first grouped event.

8. The method of claim 1, wherein each subgraph of the first set of indexed subgraphs is associated with a weighting factor.

9. The method of claim 8, wherein the weighting factor for a particular subgraph of the first set of indexed subgraphs is learned based on a frequency of occurrence of the particular subgraph from a large set of training data.

10. The method of claim 1, further comprising:
based on the plurality of subgraph groupings, determining that the second grouped event matches a third grouped event different from the first grouped event; and
ranking the first grouped event as a search result having a higher rank than the third grouped event.

11. The method of claim 1, further comprising:
forming the first relational graph by performing semantic video analysis of a video clip.

12. A method of retrieving a video clip, comprising:
receiving a video search query for a portion of video that includes a first grouped event, the first grouped event corresponding to a first relational graph, the video search query including a first video clip;
extracting and indexing a first set of subgraphs for the first grouped event based on the first relational graph, the first set of subgraphs including a plurality of subgraphs including at least one subgraph having an order of 2;
performing dimension reduction for the first grouped event to form a plurality of first subgraph groupings, each first subgraph grouping including a plurality of subgraphs of the first set of subgraphs;
comparing the plurality of first subgraph groupings to a plurality of stored subgraph groupings that correspond to stored grouped events;
based on the comparison, determining that the first grouped event matches a stored subgraph grouping of the plurality of stored subgraph groupings; and
retrieving a second video clip corresponding to the stored subgraph grouping in response to the determining.

13. The method of claim 12, wherein each first subgraph grouping corresponds to a topic related to the video and the stored subgraph grouping corresponds to a topic related to the video clip.

14. The method of claim 12, wherein the retrieved video clip is ranked among a plurality of retrieved video clips based on the comparison.

15. A method of performing video searching, comprising:
maintaining a storage of a plurality of relational graphs including at least a first relational graph, the first relational graph corresponding to a first event in a video and having a number of subgraphs of M;
for at least a first event having a corresponding first relational graph, extracting and indexing a first set of subgraphs including a plurality of subgraphs, the first set of subgraphs including at least one subgraph having an order of 2;

forming a plurality of N subgraph groupings, each subgraph grouping including a plurality of subgraphs of the first set of subgraphs, wherein N is less than M;

receiving a search request for a video search, the search request for a portion of a video that includes at least a second event; and based on the plurality of subgraph groupings, determining that the second event matches the first event.

16. The method of claim 15, wherein N is at least two orders of magnitude smaller than M.

17. A method of performing video-to-video searching, comprising:

maintaining a storage of a plurality of relational graphs, each relational graph representing a set of related information and having a number of subgraphs;

for at least a first relational graph corresponding to a first set of related information, extracting and indexing a first set of subgraphs including a plurality of subgraphs, the first set of subgraphs including p subgraphs and at least one subgraph having an order of 2;

performing dimension reduction for the first relational graph to form k variables derived from the p subgraphs, k being an integer less than p;

receiving a video clip as a search request, the search request for a second set of related information, wherein each of the first and second sets of related information is a grouped event that is part of a video; and based on the k variables, determining that the second set of related information matches the first set of related information.

18. The method of claim 17, wherein:

the k variables comprise k subgraph groupings, each subgraph grouping including a group of subgraphs from the p subgraphs.

19. The method of claim 18, wherein the second grouped event has corresponding second relational graph, and further comprising:

for the second grouped event, indexing a second set of subgraphs including a plurality of subgraphs, the second set of subgraphs including at least one subgraph having an order of 2; and performing dimension reduction for the second grouped event to form a plurality of subgraph groupings, each subgraph grouping including one or more subgraphs of the second set of subgraphs, wherein determining that the second grouped event matches the first grouped event further includes:

comparing the plurality of subgraph groupings of the second grouped event to the k subgraph groupings of the first grouped event.

20. A method of analyzing a video image, the method comprising:

analyzing plural videos to detect objects and events in each video;

in response to the analyzing, creating a relational graph for each video to obtain a plurality of relational graphs, each relational graph comprising a plurality of nodes and edges, wherein at least some of the detected objects and events are represented by each node, and wherein each edge represents a relationship between two nodes;

obtaining p subgraphs from the plurality of relational graphs, where p is an integer greater than 1, the p subgraphs forming portions of the relational graphs, at least some of the p subgraphs comprising at least two nodes of the relational graphs and an edge therebetween;

performing dimension reduction on the plurality of p subgraphs to obtain a vector of k elements for each of the videos, k being an integer less than p; and searching a first video using the vector, wherein the dimension reduction comprises topic modeling and each of the k elements comprise a topic, each topic being identified using one or more of the p subgraphs.

21. The method of claim 20, wherein the vector comprises k weights each associated with a topic identified by topic modeling, the method further comprising:

searching the first video by performing a comparison using the weight values.

22. The method of claim 20, further comprising describing each topic with a vector of weights associated with one or more of the p subgraphs.

23. The method of claim 22, wherein topic modeling comprises determining topics by performing an analysis of subgraphs of all of the plurality of videos.

24. A non-transitory, tangible, computer readable storage medium comprising a program that when executed by a computer system performs a method comprising:

storing a plurality of grouped events in the form of a plurality of corresponding relational graphs, each relational graph having a number of subgraphs;

for at least a first grouped event having a corresponding first relational graph, extracting and indexing a first set of subgraphs including a plurality of subgraphs, the first set of subgraphs including at least one subgraph having at least 1 node;

performing dimension reduction for the first grouped event to form a plurality of subgraph groupings, each subgraph grouping including a plurality of subgraphs of the first set of subgraphs;

receiving a search request for a video search, the search request for a portion of a video that includes at least a second grouped event; and based on the plurality of subgraph groupings, determining that the second grouped event matches the first grouped event.

25. A computer system comprising:

a non-transitory, tangible, computer readable storage medium; and a processor configured to execute a program stored in the non-transitory, tangible, computer readable storage medium, wherein the program performs, when executed by the processor, a method comprising:

storing a plurality of grouped events in the form of a plurality of corresponding relational graphs, each relational graph having a number of subgraphs;

for at least a first grouped event having a corresponding first relational graph, extracting and indexing a first set of subgraphs including a plurality of subgraphs, the first set of subgraphs including at least one subgraph having at least 1 node;

performing dimension reduction for the first grouped event to form a plurality of subgraph groupings, each subgraph grouping including a plurality of subgraphs of the first set of subgraphs;

receiving a search request for a video search, the search request for a portion of a video that includes at least a second grouped event; and based on the plurality of subgraph groupings, determining that the second grouped event matches the first grouped event.

* * * * *